United States Patent
Braam et al.

(10) Patent No.: US 10,254,195 B1
(45) Date of Patent: Apr. 9, 2019

(54) WIND TUNNEL FOR AERIAL VEHICLE CERTIFICATION

(71) Applicant: Amazon Technologies, Inc., Seattle, WA (US)

(72) Inventors: Jon Braam, Seattle, WA (US); Ricky Dean Welsh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 120 days.

(21) Appl. No.: 15/362,569

(22) Filed: Nov. 28, 2016

(51) Int. Cl.
  *G01M 9/00* (2006.01)
  *G01M 9/04* (2006.01)
  *G01L 9/02* (2006.01)

(52) U.S. Cl.
  CPC .................. *G01M 9/04* (2013.01); *G01L 9/02* (2013.01)

(58) Field of Classification Search
  CPC .......... G01M 9/04; G01M 9/02; G01M 9/062; G01M 9/06; G01M 9/065; G01M 9/08; G01M 17/007; G01M 17/0074; G01M 9/067; G01M 10/00; G01M 15/14; G01M 17/0072; G01M 13/027; G01M 17/0076; G01N 15/02; G01N 15/0205; G01N 25/02; G01N 33/28; G01N 11/02; G01N 13/00; G01N 15/10; G01N 19/02; G01N 2011/0093; G01N 2015/1062
  See application file for complete search history.

(56) References Cited

U.S. PATENT DOCUMENTS

| | | | | |
|---|---|---|---|---|
| 3,552,201 A | * | 1/1971 | Horanoff | G01L 5/161 73/147 |
| 3,561,264 A | * | 2/1971 | Needham | G01L 5/161 73/147 |
| 4,862,739 A | * | 9/1989 | Dobbs | G01M 9/04 73/147 |
| 5,501,101 A | | 3/1996 | Purcell | |
| 2007/0137717 A1 | | 6/2007 | Vakili | |
| 2013/0239670 A1 | | 9/2013 | Meis et al. | |
| 2014/0076041 A1 | * | 3/2014 | Adamson | G01L 27/00 73/147 |
| 2016/0363505 A1 | | 12/2016 | Sterling | |

FOREIGN PATENT DOCUMENTS

KR  2020030019897  6/2003

* cited by examiner

*Primary Examiner* — Andre J Allen
(74) *Attorney, Agent, or Firm* — Athorus, PLLC

(57) ABSTRACT

Wind tunnels may include gimbaled stings that enable aerial vehicles to be evaluated therein with respect to testing requirements established by regulatory bodies in one or more jurisdictions, such as the FAA in the United States. The gimbaled stings may be component parts of bowl assemblies that may rotate the aerial vehicles to predetermined yaw angles, pitch angles or roll angles, in order to conduct testing evolutions demonstrating that the aerial vehicles satisfy one or more of regulatory requirements. The gimbaled stings may position and reposition the aerial vehicles, as necessary, in accordance with the one or more regulatory requirements. The aerial vehicles may also operate control surfaces (e.g., flaps or rudders) during the testing evolutions, and different loading conditions or centers of gravity may be simulated by translating the aerial vehicles on the gimbaled stings in one or more directions.

20 Claims, 23 Drawing Sheets

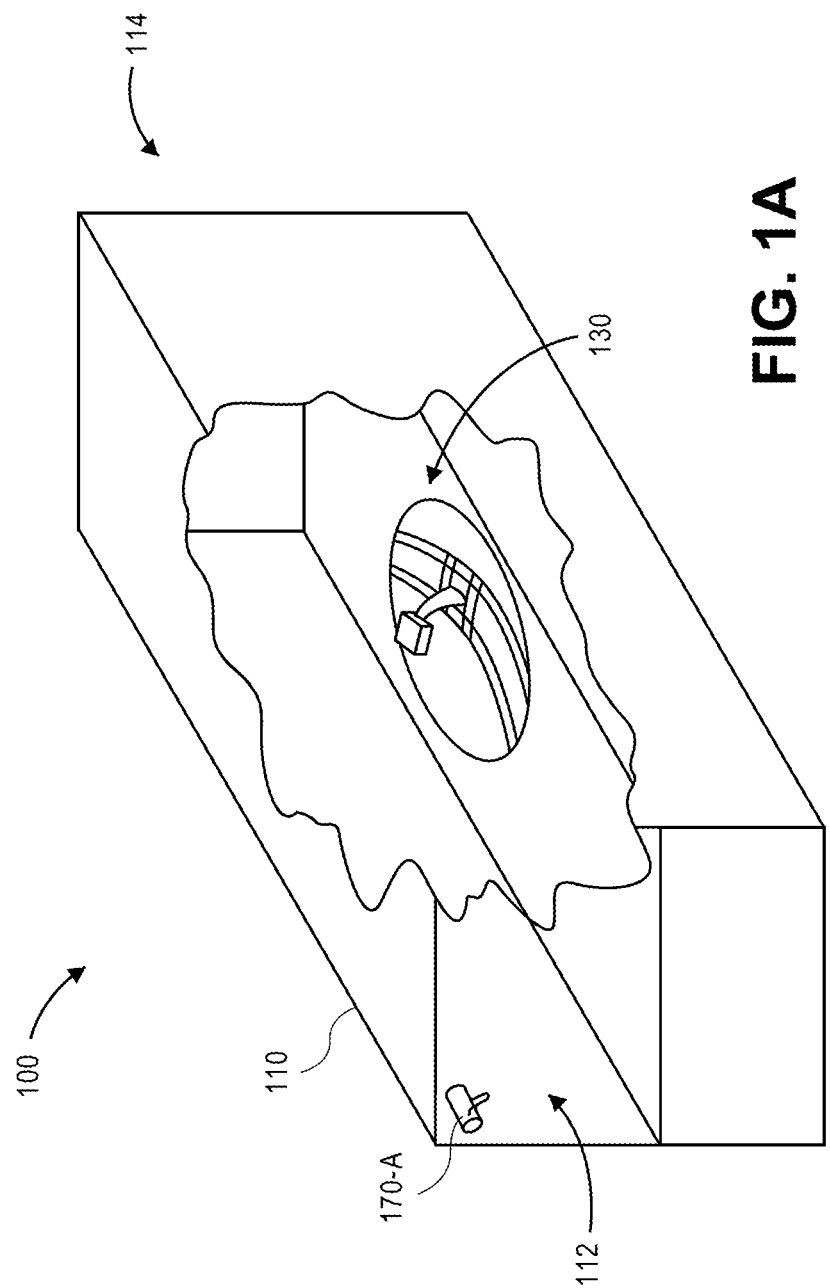

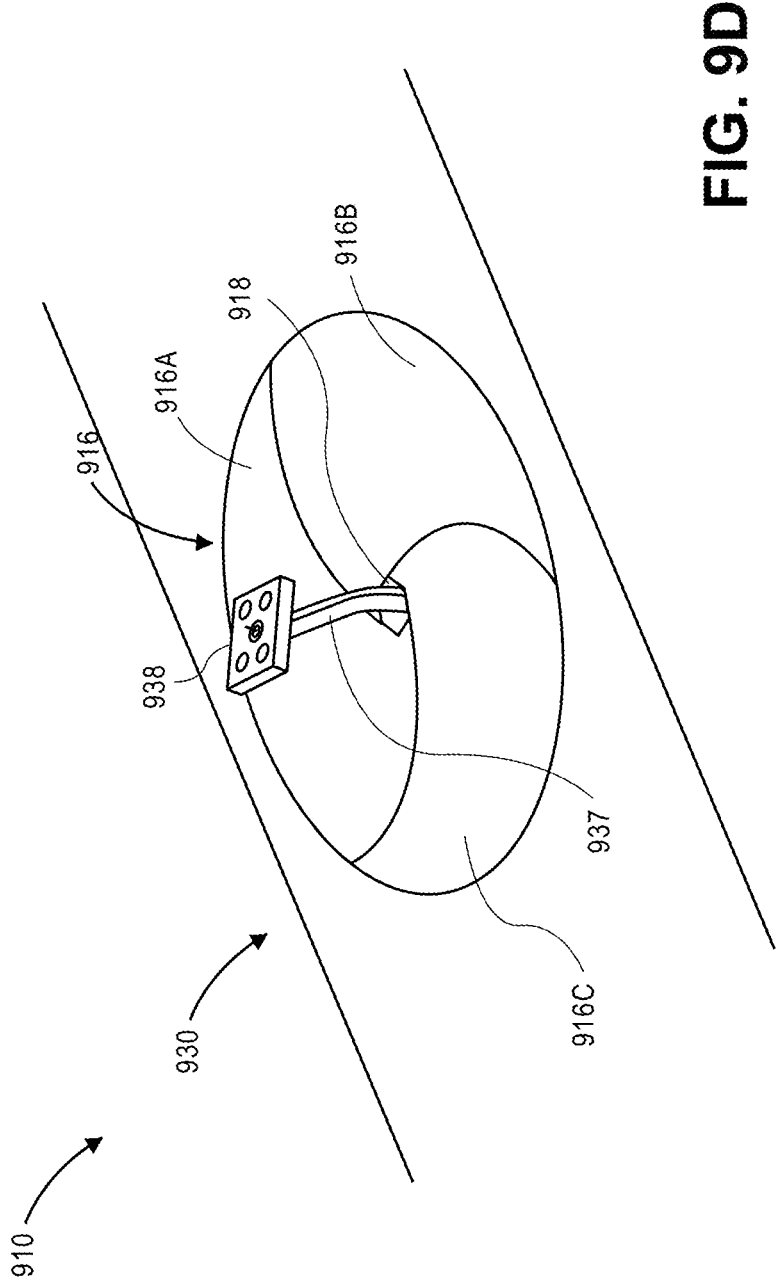

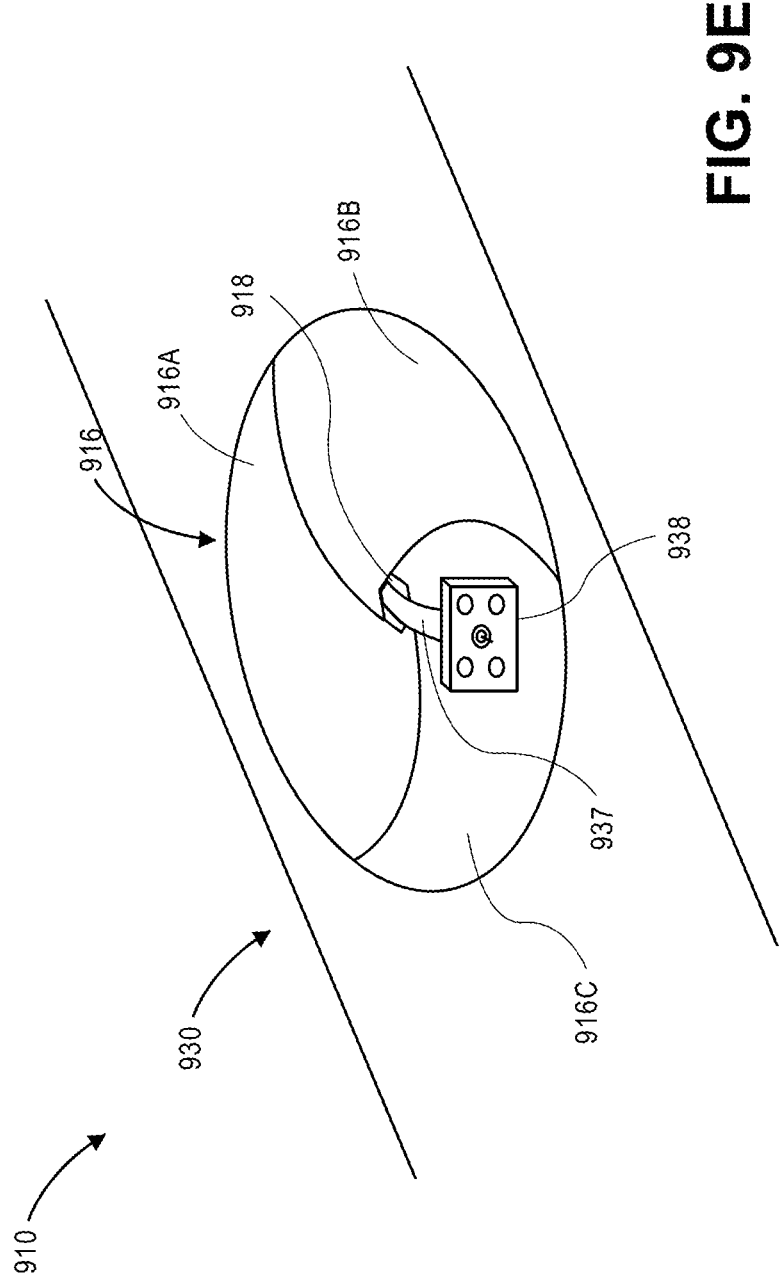

WIND TUNNEL FOR AERIAL VEHICLE CERTIFICATION

BACKGROUND

In most jurisdictions, before a newly designed aerial vehicle may conduct airborne flight operations, the aerial vehicle must undergo a number of testing evolutions in order to confirm that the design of the aerial vehicle is both safe and airworthy. In the United States, aerial vehicles must be subjected to a two-part assessment administered by the Federal Aviation Administration ("FAA"), and receive both a Type Certification and an Airworthiness Certification as prescribed in Title 14, Parts 21, 23 and 27 of the Code of Federal Regulations. According to these regulations, a newly designed aerial vehicle's sizing, electrical and power plant specifications must be evaluated in order to demonstrate that the aerial vehicle may take off, operate aloft and land reliably. Thereafter, the aerial vehicle is constructed and tested in order to validate such specifications, and confirm that the aerial vehicle may be operated safely. Similar procedures exist in other jurisdictions, including those administered by the European Aviation Safety Agency ("EASA") in Europe, or the Civil Aviation Bureau ("JCAB") in Japan.

Currently, processes for certifying an aerial vehicle as safe and airworthy are both slow and cautious in nature. For example, aircraft certification regulations in the United States, which were first enacted not long after the Wright brothers flew at Kitty Hawk, are intended to ensure the safety of pilots and passengers during flight, and to avoid injuries to those on the ground in the event of a crash. Consistent with these goals, certification processes are intentionally deliberate: in order to obtain a Type Certification and an Airworthiness Certification, a proposed aerial vehicle must be designed on paper, e.g., based on estimated loading conditions that may be expected during flight, and its specifications evaluated, before conducting testing on the various details, systems and subsystems of the proposed aerial vehicle, constructing the aerial vehicle, and subjecting the aerial vehicle to in-flight tests at various altitudes, attitudes and velocities. As a direct result, the number of new aerial vehicles that are certified and produced each year is typically very low.

Wind tunnels are hollow structural facilities in which the aerodynamic qualities and durability of rigid objects, such as aerial vehicles, may be evaluated. For example, a prototype of an aerial vehicle may be placed within a wind tunnel and subjected to artificially generated flows of air or other gases in order to evaluate the effects of aerodynamic forces or moments on the aerial vehicle, such as by simulating flight. Additionally, the air or other gases may be charged with particulate matter or liquids in order to simulate the destructive effects that such materials may have on the aerial vehicle when the aerial vehicle comes into contact with such gases, particulate matter or liquids during actual flight at various speeds or altitudes.

When an object is to be subjected to aerodynamic testing in a wind tunnel, the object is typically mounted to a fixed sting, and the flow of air or other fluids or other matter is subsequently initiated. A fixed sting is a rod or other rigid fixture that is used to provide structural support for the object in a non-obtrusive manner that minimizes any disturbances in the direction of flow.

BRIEF DESCRIPTION OF THE DRAWINGS

FIGS. 1A through 1G show views of one embodiment of a wind tunnel for aerial vehicle certification in accordance with embodiments of the present disclosure.

FIGS. 9A through 9E are views of aspects of one embodiment of a system including a wind tunnel for aerial vehicle certification in accordance with embodiments of the present disclosure.

DETAILED DESCRIPTION

Figure 1B:
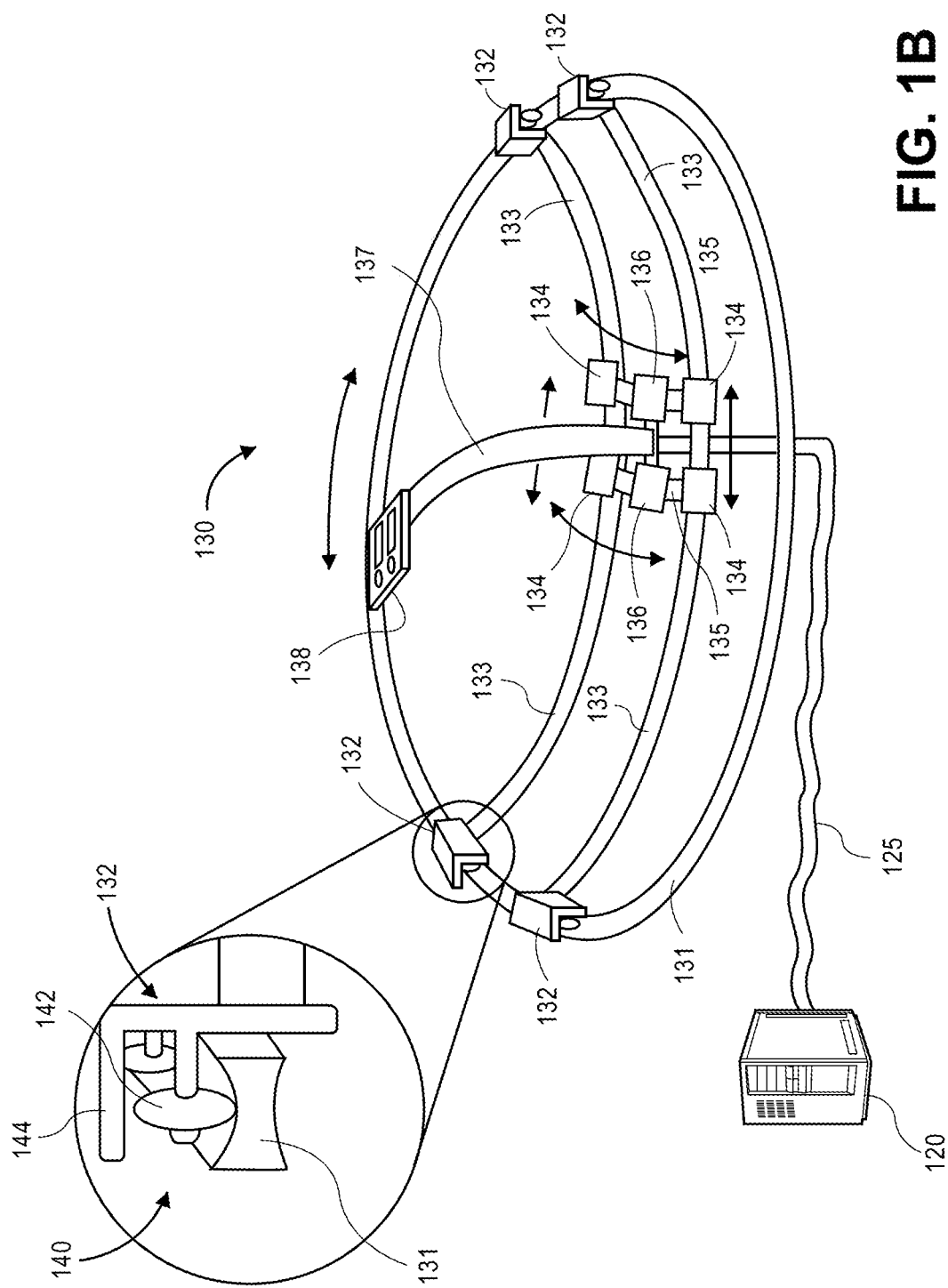

As is set forth in greater detail below, the present disclosure is directed to wind tunnels that are configured to conduct testing evolutions in order to certify an aerial vehicle for operation. More specifically, the systems and methods disclosed herein include wind tunnels having bowl assemblies with gimbaled stings or other adjustable mounts that enable aerial vehicles to be oriented, configured or positioned, as necessary, in order to complete one or more testing evolutions in accordance with requirements established by the FAA in the United States, or requirements established by regulatory bodies in one or more other jurisdictions. The gimbaled stings may enable aerial vehicles to be mounted within such wind tunnels, positioned about their principal axes to any angles of yaw, roll or pitch, and translated forward, aft or in any other direction, and subjected to wind flows at different velocities or pressures. The gimbaled stings may also include wired ports, outlets or other connections for coupling with aerial vehicles mounted thereon, and causing such aerial vehicles to operate one or more motors or rotors, or initiate deflections of control surfaces, during the performance of testing evolutions. Sensors provided within the wind tunnels may capture information or data regarding the responses of the aerial vehicles to such testing. Upon completion of the testing, such information or data may be furnished to the relevant regulatory bodies in one or more applicable jurisdictions.

Using the wind tunnels and gimbaled stings of the present disclosure, aerial vehicles may be designed, constructed and tested more rapidly than according to traditional testing methods. Moreover, the testing requirements of multiple jurisdictions may be executed in a more efficient manner, e.g., by conducting testing evolutions at specific velocities, attitudes or deflections collectively, and in an efficiently ordered manner, rather than by performing the testing for each of the jurisdictions individually.

Referring to FIGS. 1A through 1G, a system 100 including a wind tunnel 110 having a bowl assembly 130 and a pair of sensors 170-A (e.g., a Pitot tube), 170-B (e.g., a digital camera or another imaging device) within a cavity thereof is shown. The wind tunnel 110 includes an ingress port 112 and an egress port 114, as well as an upper surface, a lower surface, a left wall and a right wall forming the cavity and defining a flow path between the ingress port 112 and the egress port 114. The wind tunnel 110 also includes a bowl assembly 130 disposed on a lower surface thereof. The bowl assembly 130 includes a circular yaw rail 131, a pair of arcuate pitch rails 133, a pair of arcuate roll rails 135 and a gimbaled sting 137.

Figure 1C:
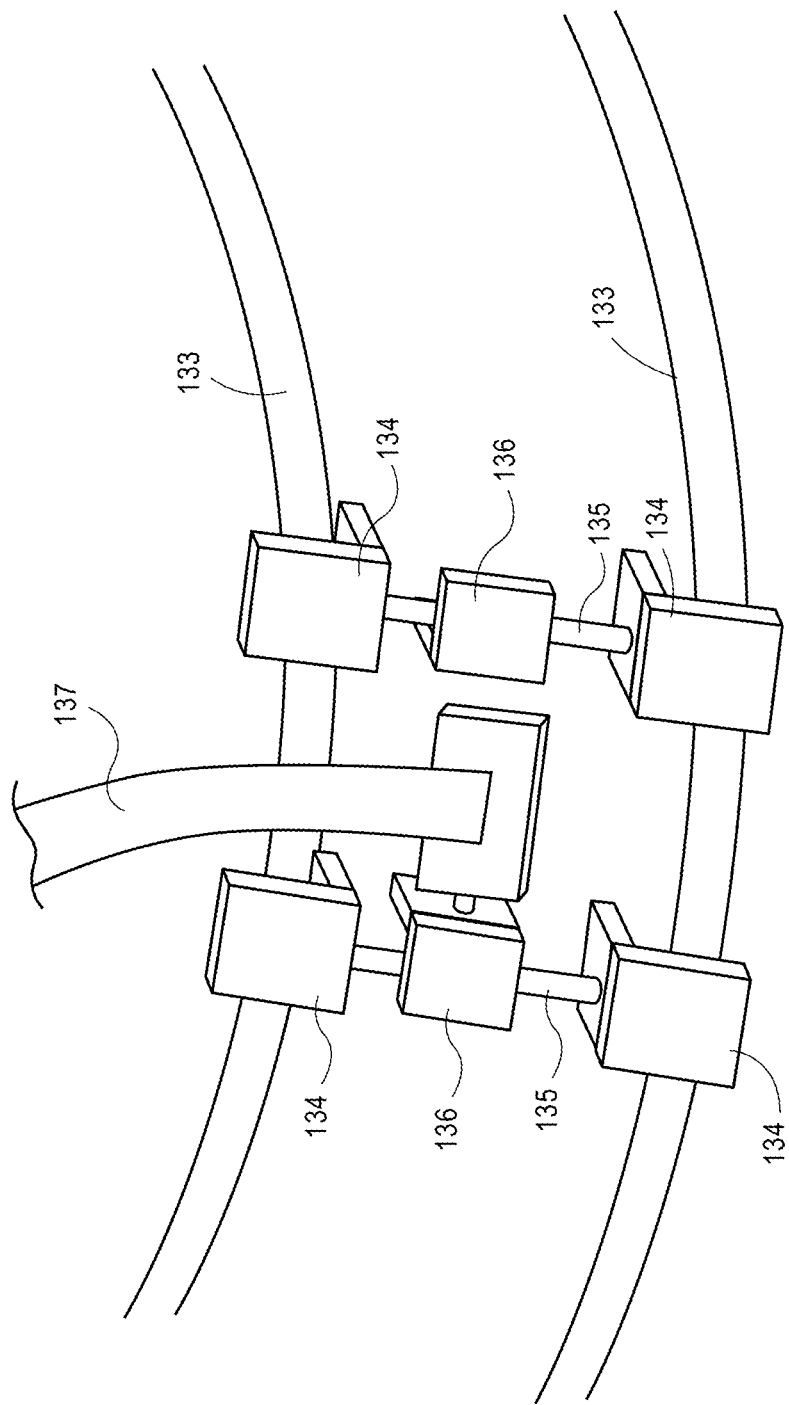
Figure 1D:
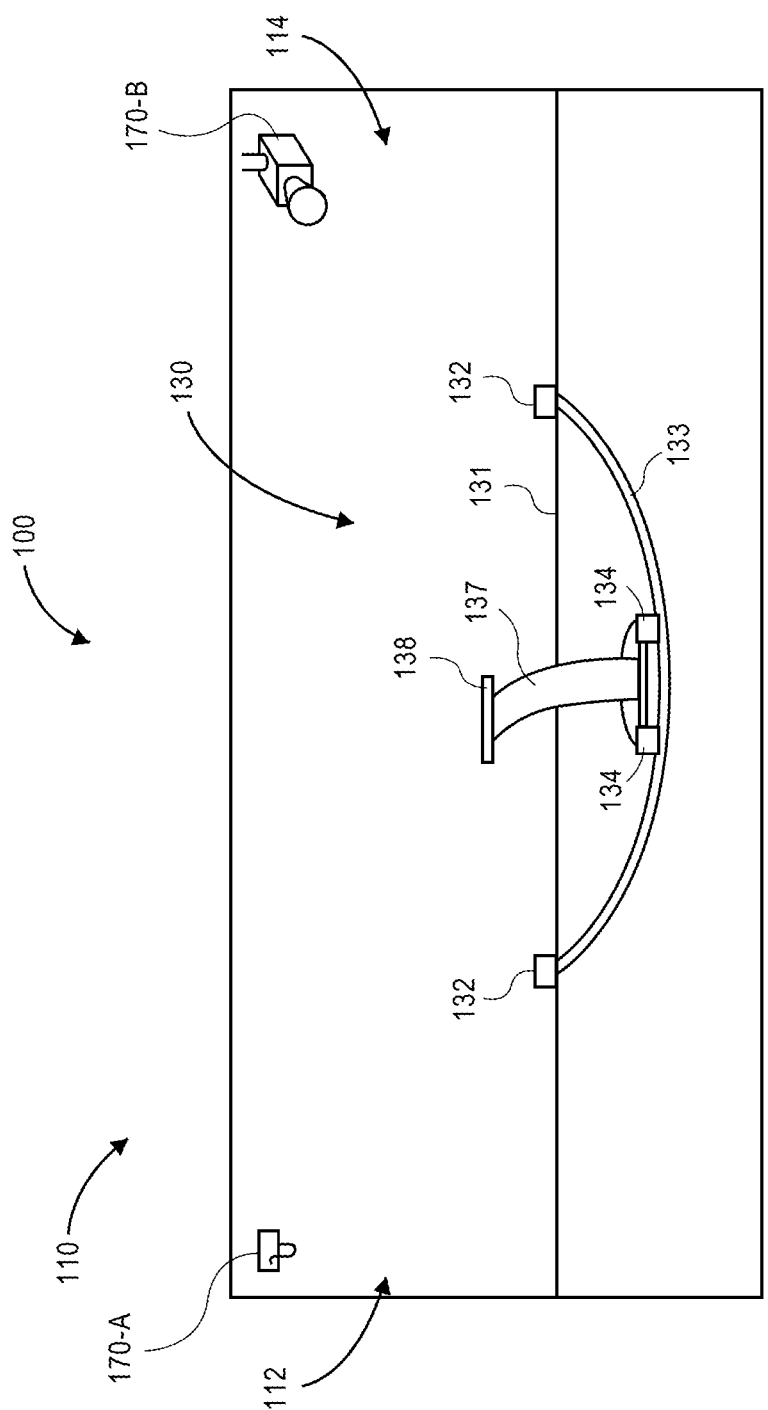
Figure 1E:
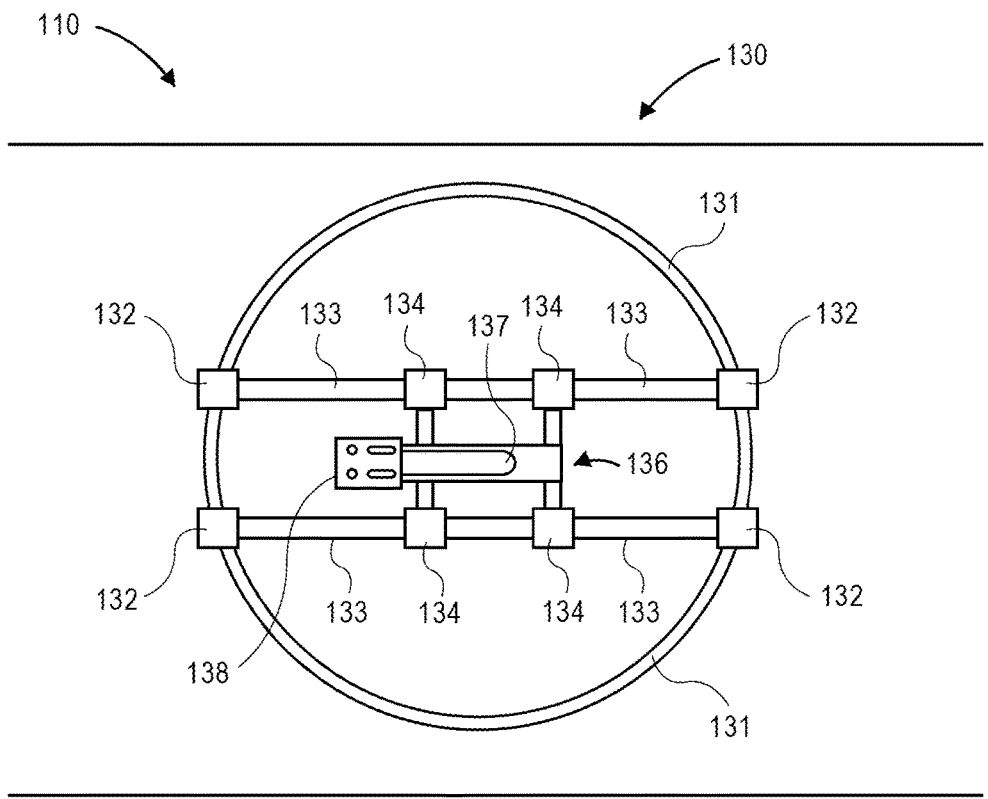
Figure 1G:
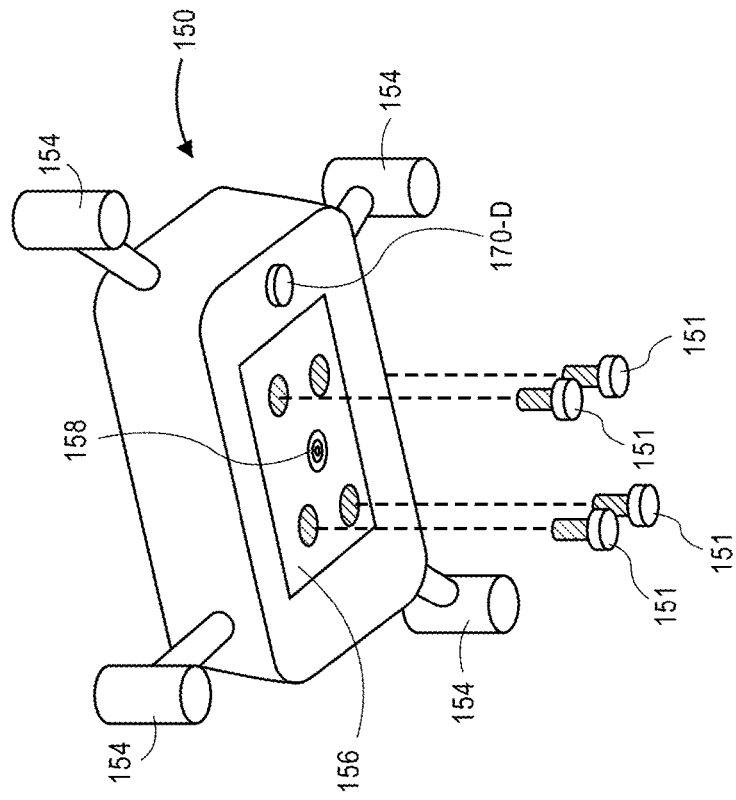
Figure 1F:
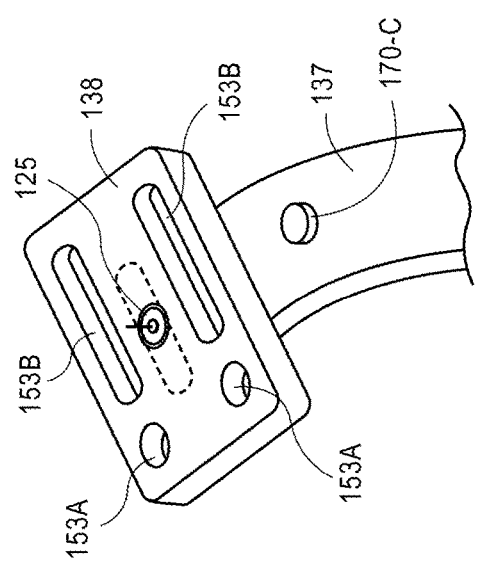

FIG. 1A is a perspective view of the wind tunnel 110 with a cutaway opening for viewing the bowl assembly 130 therein. FIG. 1B is a perspective view of the bowl assembly 130, with one of a plurality of motorized roller assemblies 132 shown in an inset. FIG. 1C is a close-up view of relationships of portions of the bowl assembly 130. FIG. 1D is a side view of the wind tunnel 110 with a cutaway opening for viewing the bowl assembly 130 therein. FIG. 1E is a top view of the wind tunnel 110 with a cutaway opening for viewing the bowl assembly 130 therein. FIG. 1F is a close-up view of portions of the gimbaled sting 137. FIG. 1G is a close-up view of portions of a test object, viz., an aerial vehicle 150, configured for mounting on the gimbaled sting 137.

The bowl assembly 130 further includes four motorized roller assemblies 132, with each of the motorized roller assemblies 132 disposed at either end of each of the pitch rails 133, which are aligned in parallel with one another. The motorized roller assemblies 132 rest on upper surfaces of the yaw rail 131, and are configured to travel on the yaw rail 131 along circular paths, e.g., in clockwise or counter-clockwise directions about a circumference of the yaw rail 131. The bowl assembly 130 also includes four motorized roller assemblies 134, with each of the motorized roller assemblies 134 disposed at either end of each of the roll rails 135, which are aligned in parallel with one another. The motorized roller assemblies 134 rest on the pitch rails 133, and are configured to travel on the concave surfaces of the pitch rails 133, which define arcuate paths extending between surfaces of the yaw rail 131 at opposite ends. The bowl assembly 130 further includes a pair of motorized roller assemblies 136, and each of the motorized roller assemblies 136 is mounted to a base section of the gimbaled sting 137. The motorized roller assemblies 136 rest on the roll rails 135, and are configured to travel on the concave surfaces of the roll rails 135, which define arcuate paths extending between the pair of pitch rails 133.

The gimbaled sting 137 is a single-strut mount including a rod or other rigid fixture (e.g., a post, a shaft, an extension) having the base section, which is mounted to the motorized roller assemblies 136 below a rim of the yaw rail 131, and a mounting section at a free end extending above the rim of the yaw rail 131. The gimbaled sting 137 may have any dimensions, shapes or cross-sections that may be selected in order to optimize flow conditions within the wind tunnel 110. For example, in some embodiments, lengths, widths (or diameters) or external surfaces of the gimbaled sting 137 may be selected based on a Reynolds number representative of inertial forces within the wind tunnel 110, or based on any other factor. Although the gimbaled sting 137 is shown as having an arcuate shape, gimbaled stings may be of any other shapes or configurations, such as straight or bent with one or more angles or points of inflection, and such shapes or configurations may be selected on any basis. For example, a shape or configuration of a gimbaled sting may be selected in order to place a test object (e.g., an aerial vehicle) at a desired angle of attack with respect to a flow of wind within the wind tunnel 110 when the gimbaled sting 137 is aligned in a neutral orientation, or in any other orientation.

As is shown in the inset of FIG. 1B, the motorized roller assemblies 132 may each include a motor 140 for driving a set of one or more wheels 142 or other rollable components that may be rotatably driven to cause the motorized roller assemblies 132 to translate circumferentially (e.g., in a clockwise or counter-clockwise direction) along upper surfaces of the yaw rail 131. The motors 140 may be any type or form of motor or engine (e.g., electric, gasoline-powered or any other type of motor) that is capable of providing sufficient rotational forces to one or more axles or shafts for causing the motorized roller assemblies 132 to travel at any desired speed or in any desired circumferential direction. The wheels 142 may be pneumatic or solid, or take any other form, and may include one or more coverings of any suitable material, e.g., rubbers and/or plastics, with any number of belts, walls, treads or other components. The motorized roller assemblies 132 further include a cover 144 or other component disposed above the yaw wheels 142, which may be cantilever-mounted within the motorized roller assemblies. In some embodiments, the motorized roller assemblies 132 may further include one or more other sets of wheels or rollable components in contact with the upper surfaces of the yaw rail 131 or, alternatively, lower surfaces of the yaw rail 131.

The motorized roller assemblies 134 and the motorized roller assemblies 136 may include components or features that are similar to those of the motorized roller assembly 132 shown in the inset of FIG. 1B, and may operate in a similar fashion. Moreover, although the motorized roller assemblies 132, the motorized roller assemblies 134 and the motorized roller assemblies 136 are shown as having wheels for rolling on rails (viz., the yaw rail 131, the pitch rails 133 and the roll rails 135, respectively), the bowl assembly 130 may be constructed with tracks or other pathways on or within which the motorized roller assemblies 132, the motorized roller assemblies 134 and the motorized roller assemblies 136 may travel in order to vary the orientation of the gimbaled sting 137 about its principal axes in accordance with the present disclosure. Alternatively, the tracks or other pathways may accommodate one or more belts or other members that may be motorized or otherwise configured to transfer forces in tension and/or compression to the pitch rails 133, the roll rails 135 and/or the gimbaled sting 137, and to cause the gimbaled sting 137 to be positioned about one or more of its principal axes accordingly.

As is shown in FIG. 1F, the free end of the gimbaled sting 137 includes a mounting plate 138 and a sensor 170-C. The mounting plate 138 is configured for mounting a test object, e.g., an aerial vehicle 150 including a plurality of motors 154. a custom mount 156 and a sensor 170-D, thereto. The mounting plate 138 includes a pair of round bores 153A, a pair of elongated bores 153B and a communications port 125. The round bores 153A, 153B are constructed to correspond with the custom mount 156 of the aerial vehicle 150, which also includes a communications connector 158, and to be joined thereto by a plurality of fasteners 151 (e.g., bolts, screws or like devices). The sensor 170-C may include, but is not limited to, any type of sensor configured to sense vibrations of the mounting plate 138 and/or a test object (e.g., the aerial vehicle 150) mounted thereto, as well as forces of tension or compression acting on the gimbaled sting 137, including but not limited to one or more accelerometers, velocity sensors, displacement sensors, or the like. The sensor 170-D may also include, but is not limited to, any type of sensor configured to sense vibrations of the aerial vehicle 150, as well as any forces of surface tension, shear or the like acting on the aerial vehicle 150.

As is shown in FIG. 1G, the fasteners 151 may extend through the mounting plate 138 to the custom mount 156, thereby releasably joining the aerial vehicle 150 to the gimbaled sting 137. Additionally, when the mounting plate 138 is joined to the custom mount 156, the communications port 125 of the gimbaled sting 137 is coupled with the communications connector 158 of the custom mount 156, thereby providing a communications conduit between the servers 120 and the aerial vehicle 150.

Operations of the wind tunnel 110 may be controlled by one or more servers 120, processors or other computer devices. Such servers 120 may be in communication with one or more fans, valves, louvers or other components (not shown) provided at the ingress port 112 or the egress port 114, or with one or more of the motorized roller assemblies 132, the motorized roller assemblies 134, the motorized roller assemblies 136. The servers 120 may be programmed with any type of instructions or other data for causing aspects of the bowl assembly 130 to be oriented, configured or positioned in any desired manner, as necessary. The servers 120 may also be programmed with one or more testing requirements established by the FAA or like regulatory bodies in one or more other jurisdictions, such as Europe or Japan. For example, the servers 120 may be programmed with a flight maneuvering envelope, which is sometimes called a "V-n diagram," or a plot of velocity versus a load factor, such as that which is codified in Title 14, Section 25.333 of the Code of Federal Regulations. The servers 120 may be further programmed with one or more instructions for operating the gimbaled sting 137 and one or more fans or flow systems to cause the aerial vehicle 150 to comply with the flight maneuvering envelope, or one or more structural or wind requirements, e.g., for causing the aerial vehicle 150 to simulate design cruising speeds, maneuvering speeds or any other requirements. The servers 120 may also be coupled to one or more of the sensor 170-A, the sensor 170-B, the sensor 170-C or the sensor 170-D, or any other sensors within the wind tunnel 110 or on the aerial vehicle 150, and configured to receive information or data from such sensors regarding one or more testing evolutions conducted therein, including but not limited to pressure differentials across surfaces of the aerial vehicle 150 during the performance of one or more testing evolutions.

The bowl assembly 130 shown in FIGS. 1A through 1G is configured to vary an orientation, a configuration or a position of the aerial vehicle 150 or another test object mounted therein about one or more principal axes. For example, by operating the motorized roller assemblies 132, the motorized roller assemblies 134 or the motorized roller assemblies 136, separately or in concert with one another, an alignment of a test object about its principal axes (e.g., a longitudinal axis, a lateral horizontal axis, or a vertical axis). As is shown in FIG. 1B, a yaw angle of the aerial vehicle 150 may be varied by operating the motorized roller assemblies 132, e.g., in a clockwise or counter-clockwise direction, to rotate the gimbaled sting 137 about a vertical axis. A pitch angle of the aerial vehicle 150 may be varied by operating the motorized roller assemblies 134, e.g., in a forward or a backward direction, to rotate the gimbaled sting 137 about a lateral horizontal axis. A roll angle of the aerial vehicle 150 may be varied by operating the motorized roller assemblies 136, e.g., in a side-to-side direction, to rotate the gimbaled sting 137 about the longitudinal axis.

In the embodiment of the wind tunnel 110 shown in FIGS. 1A through 1G, the yaw, pitch and roll angles of test objects, e.g., the aerial vehicle 150, may be varied independently or simultaneously within ranges defined by the construction of the bowl assembly 130. For example, because the yaw rail 131 is circular in shape, the aerial vehicle 150 may be placed at any yaw angle inside the wind tunnel 110. The motorized roller assemblies 132 in concert to rotate the gimbaled sting 137 in clockwise or counter-clockwise directions within a full, three hundred sixty-degree (360°) range about a vertical axis. The aerial vehicle 150 may also be placed at any pitch angle within a range defined by the shape and the lengths of the pitch rails 133, by operating the motorized roller assemblies 134 in concert to rotate the gimbaled sting 137 about a lateral horizontal axis. The aerial vehicle 150 may further be placed at any roll angle within a range defined by the shape and the lengths of the roll rails 135, by operating the motorized roller assemblies 136 in concert to rotate the gimbaled sting 137 about a longitudinal axis. In some embodiments, the ranges of the pitch angles and the roll angles of test objects mounted to the gimbaled sting 137 may be limited to a maximum of one hundred eighty degrees (180°), or a maximum deviation of ninety degrees (90°) from a neutral orientation. In some other embodiments, the ranges of the pitch angles and the roll angles of test objects mounted to the gimbaled sting 137 may be limited to approximately ninety degrees (90°), or a maximum deviation of forty-five degrees (45°) from a neutral orientation.

In addition to rotating a test object (e.g., the aerial vehicle 150) about its principal axes (e.g., a longitudinal axis, a lateral horizontal axis and/or a vertical axis), the bowl assembly 130 may also be configured to translate the test object in a linear direction along the principal axes. For example, in some embodiments, the mounting plate 138 may be articulable, and may include one or more motorized components for translating test objects in directions parallel to a plane defined by the mounting plate 138 (e.g., forward or backward, or left or right). Such motorized components may include tracks, rails or other features for shifting test objects in such directions, thereby enabling the bowl assembly 130 to vary the locations of their respective centers of gravity accordingly.

Therefore, in accordance with the present disclosure, a wind tunnel having a gimbaled sting that may be oriented, configured or positioned to enable an aerial vehicle mounted thereon to simulate the testing requirements of the FAA or counterpart regulatory bodies in other countries may enable aircraft designs to be constructed and approved more quickly than according to methods of the prior art. In particular, wind tunnels may include bowl assemblies or like structures to which newly designed test objects, such as aerial vehicles, may be mounted, and oriented, configured or positioned (or reoriented, reconfigured or repositioned), as necessary, in order to conduct any testing evolutions on the ground, and not in flight, that may be required for approval of the test objects for full-scale production.

In nearly every modern nation where aerial vehicles operate aloft, a newly designed aerial vehicle must satisfy a number of regulatory requirements in order to confirm that the aerial vehicle may operate safely. In the United States, such requirements are codified in Title 14 of the Code of Federal Regulations, which includes specific regulations and criteria for confirming that an aerial vehicle's propellers, engines, airframe and other components are airworthy, and that the aerial vehicle's fuel venting, exhaust, emitted noise and other after-effects of flight operation are satisfactory. Similarly, in Europe, the EASA also issues type certificates of aircraft and aircraft parts that are valid within the European Union, approves aircraft designs or deviations from requirements, determines the airworthiness of aircraft designs, and monitors the continued airworthiness of approved designs. In Japan, the JCAB similarly issues type certificates for aircraft, and type approvals for aircraft parts such as engines or propellers.

In each country or other jurisdiction, compliance with type certification standards requires substantial analysis and testing, and the obligations to establish such compliance are physically onerous and burdensome, requiring dozens of hours of flight at specified conditions. For example, Title 14, Section 23.305(a) of the Code of Federal Regulations requires that an aerial vehicle "structure must be able to support limit loads without detrimental, permanent deformation. At any load up to limit loads, the deformation may not interfere with safe operation." Likewise, Title 14, Section 23.305(b) requires that the aerial vehicle "structure must be able to support ultimate loads without failure for at least three seconds, except local failures or structural instabilities between limit and ultimate load are acceptable only if the structure can sustain the required ultimate load for at least three seconds." Title 14, Section 23.301(b) requires that "air, ground, and water loads must be placed in equilibrium with inertia forces, considering each item of mass in the airplane. These loads must be distributed to conservatively approximate or closely represent actual conditions. Methods used to determine load intensities and distribution on canard and tandem wing configurations must be validated by flight test measurement unless the methods used for determining those loading conditions are shown to be reliable or conservative on the configuration under consideration." Other sections of Title 14 of the Code of Federal Regulations specify standards that must be met regarding an aircraft's flight operations, including flight operations standards in Subpart B, structural standards in Subpart C, design and construction standards in Subpart D, power plant standards in Subpart E, equipment standards in Subpart F, and operating limitations and information in Subpart G.

The regulatory regimes for approving aircraft designs were established with manned aircraft in mind, and were intended to be particularly rigorous, in order to ensure the safety of all who participate in civil aviation, including pilots, passengers and crew of manned aircraft, and civilians on the ground below. The hazards of airborne flight testing of aerial vehicles may be significantly reduced, however, where such testing is performed in a ground-based environment.

Wind tunnels are controlled environments in which the aerodynamic properties and durability of one or more objects may be evaluated. More particularly, in a wind tunnel, flows of air or other gases across objects such as vehicles, structures or other objects may be monitored and tracked in order to provide a greater understanding as to the effects of forces, moments and other wind-related effects on such objects. Information regarding such effects may be used to confirm the suitability or reliability of a design of an object, to alter the design, or to design other objects.

Wind tunnels generally comprise tube-like environments formed in open-circuit or closed-circuit paths that include fans or other prime movers for generating a flow of air or other gases throughout the environments and along the paths. Wind tunnels may further include a number of sensors or other instruments such as Pitot tubes, anemometers or pressure sensors, as well as imaging devices, which may detect and track information or data regarding the object and the flow of air or gases over the object at an interface that is sometimes called a "boundary layer." Some of the information or data that may be detected and tracked may include, but is not limited to, pressures, velocities, densities, temperatures, viscosities or compressibilities of the flowing gases, as well as moments or forces such as lift, drag, pitch, yaw or roll on the objects. Moreover, the objects themselves may be configured with one or more sensors or other telltale indicators of the flow conditions within the wind tunnel, including one or more pressure sensors provided on a skin or outer layer of an object, as well as one or more tufts, or one or more elongated strands or attachments of lightweight material dangling from the object, which visibly indicate the paths taken by air traveling over the object.

Additionally, wind tunnels may include one or more portals, windows or other visual openings through which the effects of the air or gases on the objects may be observed, e.g., by human eyes or one or more imaging devices. The effects of air or other gases on an object may be enhanced by one or more flow visualization techniques. For example, a testing environment may be charged with smoke, dyes, vapors or other fine materials that travel within airflow and enable the air flowing over an object to be observed with greater detail. Wind tunnels may also include one or more components for modifying the direction of airflow prior to or within a testing environment, or changing the pressure of the airflow, and removing any turbulence therefrom. With the evolution of advanced computer-based design techniques, wind tunnels now have value as a final validator of a computer-generated design, e.g., to confirm the effects of the behavior of air or other gases on the object, and to operate in concert with techniques.

Wind tunnels may be designed to accommodate the flow of air or other gases at any speed, including subsonic (e.g., speeds of less than two hundred fifty miles per hour, or 250 mph), transonic (e.g., speeds between two hundred fifty miles per hour and the speed of sound, or about 768 mph), or supersonic (e.g., speeds greater than the speed of sound). While airflows in subsonic wind tunnels may be generated by one or more fans or other like devices, airflows in transonic or supersonic wind tunnels are typically generated using compressed air or other gases that are stored in tanks and released into the controlled environment of the wind tunnel.

In this regard, wind tunnels are essential tools for physically confirming the validity and durability of attributes of a theoretical design. By subjecting an object such as an aerial vehicle, or a sufficiently sized prototype of the object, to wind or other environmental conditions that may be expected to be encountered by the object, actual aerodynamic information regarding the behavior or performance of the object in such conditions may be gathered, and designs may be verified or subsequently refined accordingly.

The systems and methods of the present disclosure are directed to wind tunnels that are configured to conduct testing evolutions that are required in order to certify test objects, e.g., manned or unmanned aerial vehicles, for safe operation. Such wind tunnels may include bowl assemblies or like structures with gimbaled stings or other adjustable mounts that enable aerial vehicles to be reoriented, reconfigured or repositioned, as necessary. The wind tunnels may have a number of flow systems including fans, valves, louvers or other components for generating adequate flows of air or other gases within the wind tunnels, as well as sensors such as strain gages, cameras or other imaging devices, pressure sensors, temperature sensors, hygrometers, air speed sensors (e.g., Pitot tubes or anemometers) or the like for monitoring conditions that may be mounted within the wind tunnels or affixed to the aerial vehicles during the evaluation of test objects, or responses of the test objects to testing.

The systems and methods of the present disclosure may be configured to generate and execute test plans including any number of evolutions therein, by automatically orienting, configuring or positioning an aerial vehicle or other test object within a wind tunnel, and subjecting the aerial vehicle to flows of air or other gases at velocities or pressures that are sufficient to demonstrate the compliance of the aerial vehicle with regulatory requirements in one or more jurisdictions. The wind tunnels of the present disclosure may be programmed to execute testing evolutions that are required in order to certify a newly designed aerial vehicle in such jurisdictions in an orderly manner, including not only an outer mold line, or "OML," of the aerial vehicle but also one or more internal aspects of the aerial vehicle, e.g., internal support structures, subject to any number of wind or loading conditions. For example, where each of a plurality of countries or other jurisdictions requires that an aerial vehicle be subjected to forces resulting from the flow of air or other gases at specific velocities or pressures, and with the aerial vehicle in various orientations, configurations or positions, the specific order of testing evolutions conducted on the aerial vehicle may be selected in a manner that minimizes the timing required to complete such evolutions, or that ensures that such evolutions are completed in a most efficient manner, even if the evolutions required by a specific jurisdiction are performed out-of-sequence.

Figure 2:
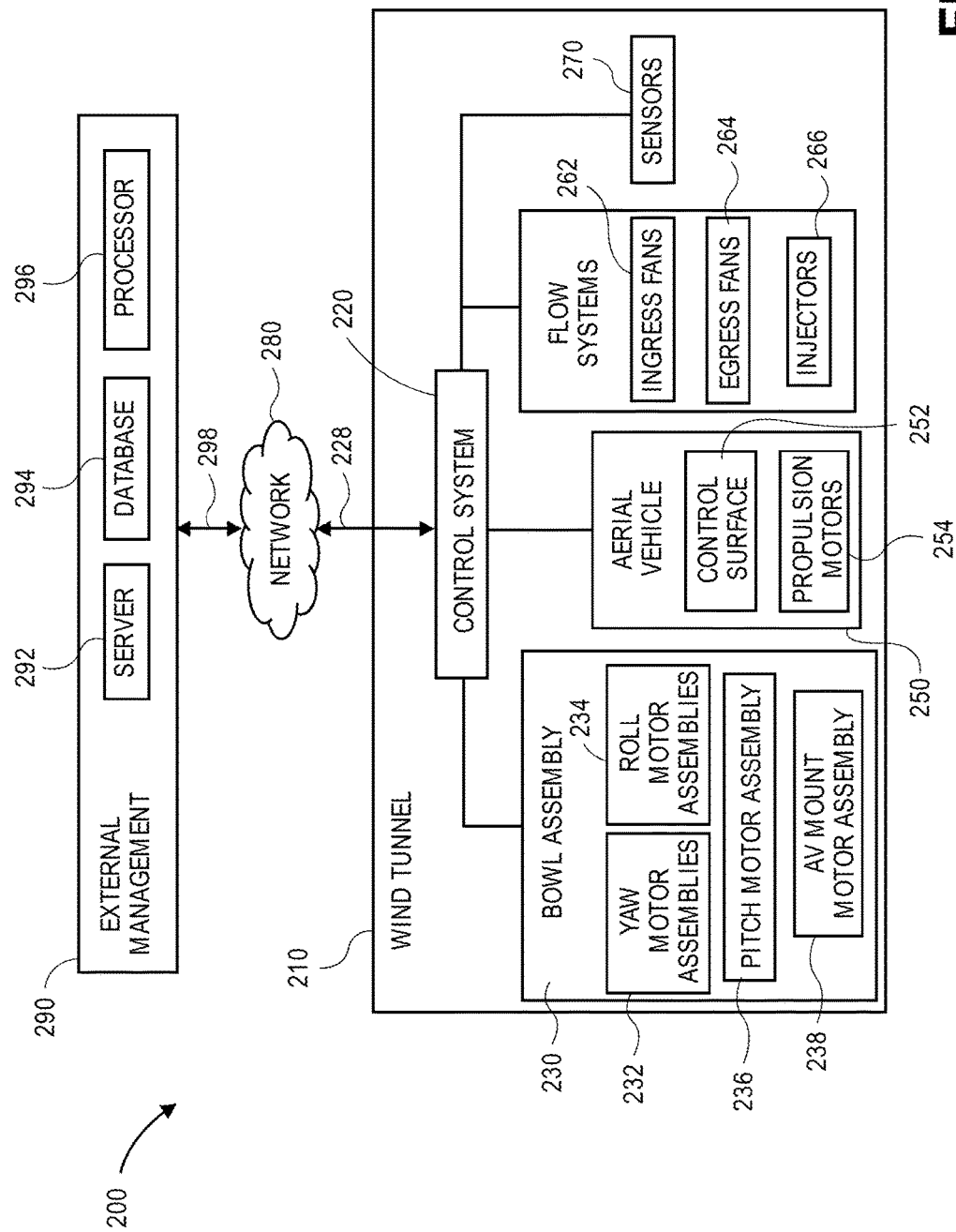
FIG. 2 is a block diagram of one embodiment of a system including a wind tunnel for aerial vehicle certification in accordance with embodiments of the present disclosure.

Operation of the various aspects of the wind tunnels disclosed herein, including the flow systems for initiating flow therein, the bowl assemblies for orienting, configuring or positioning aerial vehicles or other test objects therein, or any other systems or assemblies, may be controlled by computer-based systems within or in association with the wind tunnels, onboard the aerial vehicles, or in any other location. Referring to FIG. 2, a block diagram of components of one system 200 including a wind tunnel for aerial vehicle certification in accordance with embodiments of the present disclosure is shown. Except where otherwise noted, reference numerals preceded by the number "2" shown in FIG. 2 indicate components or features that are similar to components or features having similar reference numerals preceded by the number "1" shown in FIGS. 1A through 1G.

As is shown in FIG. 2, the system 200 includes a wind tunnel 210 and an external management system 290 connected to one another over a network 280, which may include the Internet, in whole or in part. The wind tunnel 210 may be a physical structure, e.g., a cavity, that is defined by walls, floors, ceilings or other surfaces formed from any number of materials and includes one or more openings (e.g., an ingress opening and an egress opening). The wind tunnel 210 of FIG. 2 includes a control system 220, a bowl assembly 230, an aerial vehicle 250, a plurality of flow systems 260 and one or more sensors 270.

The control system 220 may include one or more processors, memory or storage components (e.g., data stores), power supplies, transceivers or other communication equipment, or like systems, devices or components. As is shown in FIG. 2, the control system 220 is in communication with the bowl assembly 230, the aerial vehicle 250, the flow systems 260 and/or the sensors 270, and may be configured to control the operation of the bowl assembly 230, the aerial vehicle 250 mounted thereon, or the flow systems 260, as desired, or the processing or storage of information or data captured using one or more of the sensors 270. For example, the control system 220 may be configured to cause or control the operation of one or more motor assemblies of the bowl assembly 230, thereby realigning an aerial vehicle or other test object within the wind tunnel 210, or to initiate or secure flows of air or other gases within the wind tunnel 210. The control system 220 may also cause the aerial vehicle to align, deflect or translate one or more movable aspects thereof (e.g., propulsion motors or control surfaces such as wings, rudders, ailerons, elevators, flaps, brakes, slats or other features) in order to simulate the effects of air flow on such aspects during flight. The control system 220 may further designate information or data that is to be captured using the one or more sensors 270 during testing evolutions, and may receive and process such information or data by the one or more processors, or store such information data in the one or more memory components or devices associated therewith.

The control system 220 may be provided as a freestanding system accessible to the wind tunnel 210 over the network 280. Alternatively, the control system 220 may be further provided in connection with one or more other components of the system 200 of FIG. 2, such as the bowl assembly 230 or the external management system 290. The control system 220 may include one or more computers, servers and/or devices featuring the necessary electronics, software, memory, storage, databases, firmware, logic/state machines, microprocessors, communication links, displays or other visual or audio user interfaces, printing devices, and any other input/output interfaces to provide any of the functions or services regarding the operation of any one of the components within the wind tunnel 210, or the various sensors 270 therein. Such computers, servers and/or devices may be operated independently, or may receive instructions or commands from one or more external computer devices or system components, such as the external management system 290, by way of the network 280, as indicated by lines 228 and 298, through the sending and receiving of digital data.

In some embodiments, the control system 220 may be programmed with one or more instructions for operating aspects of the bowl assembly 230 or the aerial vehicle 250, or initiating or securing flow by one or more of the flow systems 260, in order to perform one or more testing evolutions. For example, the control system 220 may be programmed to comply with a flight maneuvering envelope, a V-n diagram, or one or more structural or wind requirements, or instructions for simulating design cruising speeds, maneuvering speeds or any other requirements associated with approving aerial vehicle designs in the United States or in other countries. The control system 220 may also be configured to receive information or data from the one or more sensors 270 regarding one or more testing evolutions conducted therein, including but not limited to pressure differentials across surfaces of the aerial vehicle 250 during the performance of one or more testing evolutions.

The bowl assembly 230 includes a plurality of motors (or engines or other prime movers) for orienting, configuring or positioning the aerial vehicle 250 or another test object within the wind tunnel 210, as necessary. As is shown in FIG. 2, the bowl assembly 230 includes a plurality of yaw motor assemblies 232, a plurality of pitch motor assemblies 234 and a plurality of roll motor assemblies 236 for positioning or repositioning the aerial vehicle 250 about one or more principal axes, e.g., at predetermined yaw angles, pitch angles or roll angles, as desired. The bowl assembly 230 may further include a motorized mount 238 for mounting the aerial vehicle 250 to a gimbaled sting or other element of the bowl assembly 230.

The motor assemblies 232, 234, 236 may include any type of motor (e.g., electric, gasoline-powered or any other type of motor) capable of generating sufficient torque to manipulate aspects of the bowl assembly 230, e.g., a gimbaled sting, within the wind tunnel 210. For example, one or more of the motor assemblies 232, 234, 236 may include a brushless DC motor such as an outrunner brushless motor or an inrunner brushless motor. Moreover, the motors within the motor assemblies 232, 234, 236 may be similar or identical to one another, and may feature similar or identical features (e.g., power sources, numbers of poles, whether the motors are synchronous or asynchronous) or operational capacities (e.g., angular velocities, torques, operating speeds or operating durations). Alternatively, two or more of the motors within the motor assemblies 232, 234, 236 may have different features or capacities, based on an extent to which use of such motors is desired or required to orient, configure or position the aerial vehicle 250 or another test object therein.

The motorized mount 238 may be any component for translating a test object mounted to the bowl assembly 230, e.g., the aerial vehicle 150 mounted to the gimbaled sting 137 of FIGS. 1F and 1G, in any direction. In some embodiments, the motorized mount 238 may be configured to translate a test object in directions associated with the principal axes of the aerial vehicle 250, e.g., forward or backward along a longitudinal axis, left or right along a lateral horizontal axis, or upward or downward along a vertical axis, in order to further orient, configure or position in accordance with one or more testing evolutions.

The aerial vehicle 250 may be any manned or unmanned aerial vehicle (e.g., a drone) having a size and shape that may be accommodated within a structure defined by the wind tunnel 210 with sufficient clearance to conduct one or more operational testing evolutions therein. As is shown in FIG. 2, the aerial vehicle 250 includes one or more control surfaces 252 and one or more propulsion motors 254. The control surfaces 252 may be any sections or appurtenances provided on the aerial vehicle 250 that may be manipulated in order to dynamically modify an orientation, a configuration or a position of the aerial vehicle 250 in flight with respect to one or more degrees of freedom. For example, the control surfaces 252 may include, but are not limited to, wings, rudders, ailerons, elevators, flaps, brakes or slats, or other features.

The propulsion motors 254 may be any type or form of motor (e.g., electric, gasoline-powered or any other type of motor) capable of generating sufficient rotational speeds of one or more propellers or other components to provide lift and/or thrust forces to the aerial vehicle 250 and any engaged payload, and to aerially transport the engaged payload thereby. For example, one or more of the propulsion motors 254 may be a brushless direct current (DC) motor such as an outrunner brushless motor or an inrunner brushless motor. The aerial vehicle 250 may include any number of such propulsion motors 254 of any kind. For example, one or more of the propulsion motors 254 may be aligned or configured to provide forces of lift to the aerial vehicle 250, exclusively, while one or more of the propulsion motors 254 may be aligned or configured to provide forces of thrust to the aerial vehicle 250, exclusively. Alternatively, one or more of the propulsion motors 254 may be aligned or configured to provide forces of lift and forces of thrust to the aerial vehicle 250, as needed. For example, the propulsion motors 254 may be fixed in their orientation on the aerial vehicle 250, or configured to vary their respective orientations, e.g., a tilt-rotor aircraft. Moreover, the propulsion motors 254 may be aligned or configured to operate with different capacities or ratings, or at different speeds, or coupled to propellers having different sizes and shapes.

The aerial vehicle 250 may also include one or more processors, memory or storage components (e.g., data stores), power supplies, transceivers or other communication equipment, lighting apparatuses, payload control devices or like systems, devices or components. The aerial vehicle 250 may be configured to receive operating instructions from the control system 220 or from one or more external computer systems, e.g., the external management system 290 or others, over the network 280, or to autonomously operate the control surfaces 252, the propulsion motors 254 or any other like systems.

The flow systems 260 may include a plurality of machines, devices or components for initiating or securing air flow within the wind tunnel. The flow systems 260 may be aligned within or along a flow path extending between the ingress fans 222 and the egress fans 224, and may be configured to inject any type or form of materials into the flow of a fluid therein. As is shown in FIG. 2, the flow systems 260 include one or more ingress fans 262, one or more egress fans 264, and one or more injection systems 266, which may inject solids, liquids or gases of any type or form that are maintained at any temperature or pressure, such as oils, sands or powders having particles of any size, as may be desired or required in order to complete one or more testing evolutions on the aerial vehicle 250 or other test objects within the wind tunnel 210. The flow systems 260 may further include one or more intake or exhaust valves or other manually or automatically operable components (not shown) for causing air or other fluids to enter the wind tunnel 210 from an exterior, or depart the wind tunnel 210 to the exterior. Such intake valves or components may, for example, include one or more openings for initiating, throttling or securing flow through the wind tunnel 210. Such valves or other components may be associated with the ingress fans 262, the egress fans 264 or the injection systems 266, or be separately constituted features. The flow systems 260 may further include one or more static or dynamic components such as flow separators for conditioning flow received from an exterior of the wind tunnel 210, prior to transferring at least some of the flow to a test section 250.

The sensors 270 may be any devices for sensing conditions within the wind tunnel 210, e.g., environmental conditions within the wind tunnel 210 during the performance of one or more testing evolutions, or responses of the aerial vehicle 250 or another test object mounted within the wind tunnel 210 during one or more of such evolutions. The sensors 270 may be fixed to one or more walls, floors, ceilings or other surfaces of the wind tunnel 210, or to the aerial vehicle 250, and may include, but are not limited to, one or more strain gages, cameras or other imaging devices, pressure sensors, temperature sensors, hygrometers, air speed sensors (e.g., Pitot tubes or anemometers) or the like, for capturing information or data regarding the wind tunnel 210 and/or the aerial vehicle 250. The sensors 270 may be in communication with the control system 220 and/or with one or more external computer systems, e.g., the external management system 290, over the network 280.

The external management system 290 includes one or more physical computer servers 292 having a plurality of databases 294 associated therewith, as well as one or more computer processors 296 provided for any specific or general purpose. For example, the external management system 290 of FIG. 2 may be independently provided for the exclusive purpose of managing or monitoring testing evolutions occurring within the wind tunnel 250, or obtaining, analyzing or storing information or data regarding such testing, including such information or data that may be obtained from one or more of the sensors 270. In some embodiments, the external management system 290 may be configured to provide instructions for conducting testing evolutions to satisfy aerial vehicle certification requirements in one or more countries, including but not limited to the United States. In some other embodiments, the external management system 290 may be configured to receive information or data from the sensors 270, and to process or otherwise interpret such information or data, and store such information or data in the database 294 or in one or more alternate or virtual locations, e.g., in a "cloud"-based environment. The external management system 290 may be provided in connection with one or more physical or virtual services, and the servers 292 may be connected to or otherwise communicate with the databases 294 and the processors 296. The databases 294 may store any type of information or data, including digital media files or any like files containing multimedia (e.g., audio and/or video content) regarding operational or destructive testing of the one or more test objects 20, and for any purpose. The servers 292 and/or the computer processors 296 may also connect to or otherwise communicate with the external network 290, as indicated by line 298, through the sending and receiving of digital data.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those skilled in the pertinent arts will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those skilled in the pertinent arts will understand that process elements described herein as being performed by a "wind tunnel," a "bowl assembly," an "aerial vehicle," a "flow system," a "sensor" or an "external management system," or like terms, may be automated steps performed by their respective computer systems, or implemented within software modules (or computer programs) executed by one or more general purpose computers. Moreover, process steps described as being performed by a "wind tunnel," a "bowl assembly," an "aerial vehicle," a "flow system," a "sensor" or an "external management system" may be typically performed by a human operator, but could, alternatively, be performed by an automated agent.

The wind tunnel 210 and/or the external management system 290, or the various components thereof, may use any network-enabled or Internet applications or features, or any other client-server applications or features including electronic mail (or E-mail), or other messaging techniques, to connect to the network 280 or to communicate with one another, such as through short or multimedia messaging service (SMS or MMS) text messages. The wind tunnel 210 and/or the external management system 290, or the various components thereof, may also communicate according to any wired or wireless means or protocols, including but not limited to Wireless Fidelity (or "Wi-Fi"), Bluetooth, near-field communication, cellular technologies, or others. The protocols and components for providing communication between such devices are well known to those skilled in the art of computer communications and need not be described in more detail herein.

The data and/or computer executable instructions, programs, firmware, software and the like (also referred to herein as "computer executable" components or modules) described herein may be stored on a computer-readable medium that is within or accessible by computers or computer components such as the control system 220, the serer 292 or any computer devices associated with one or more of the bowl assembly 230, the aerial vehicle 250, the flow systems 260 or the sensors 270, or any other computers or control systems utilized by the wind tunnel 210 and/or the external management system 290 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the non-transitory computer readable medium, such as a floppy drive, CD-ROM drive, DVD-ROM drive, network interface, or the like, or via external connections.

Figure 3:
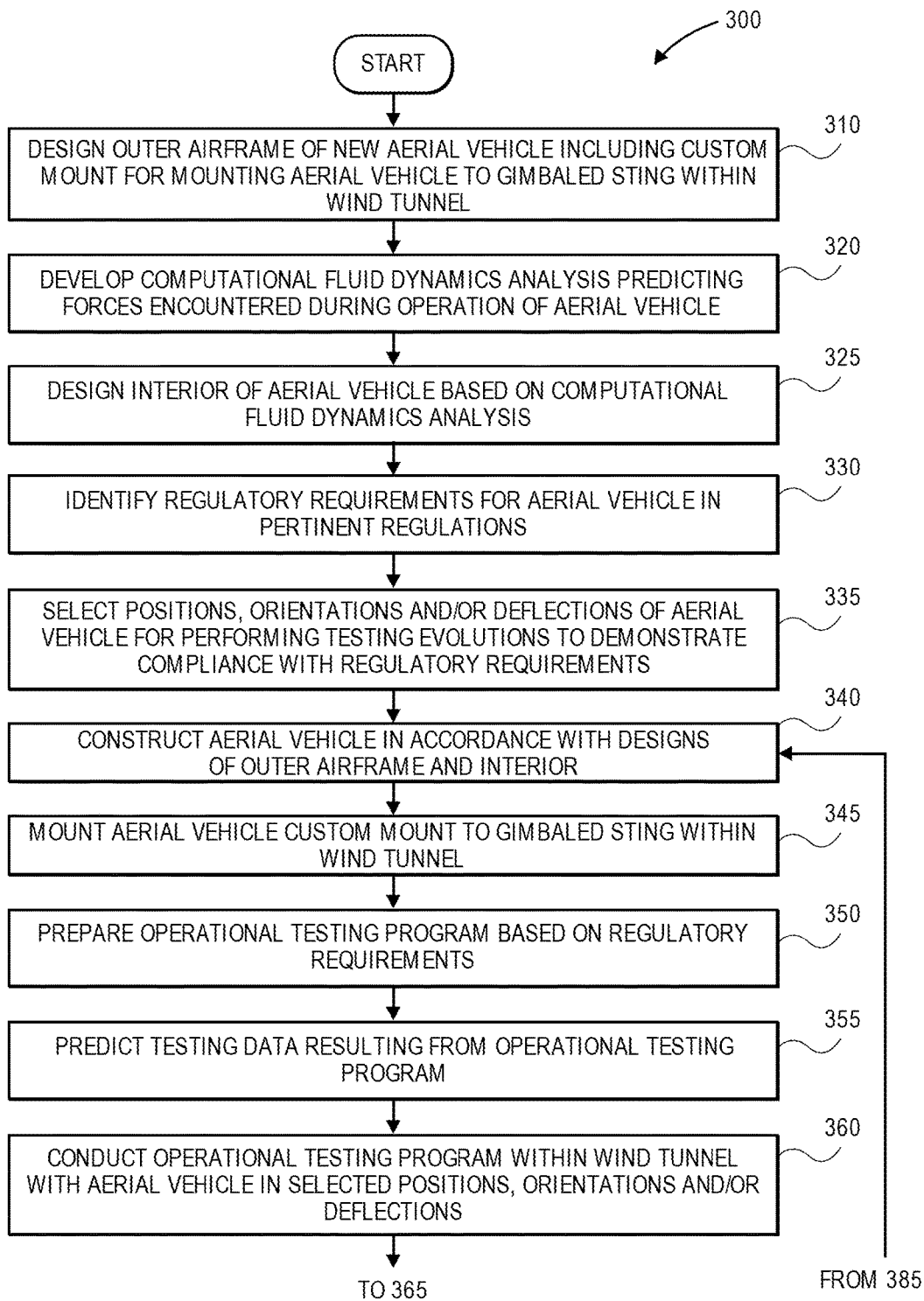
FIG. 3 is a flow chart of one operational testing process that may be performed using a wind tunnel for aerial vehicle certification in accordance with embodiments of the present disclosure.
Figure 3:
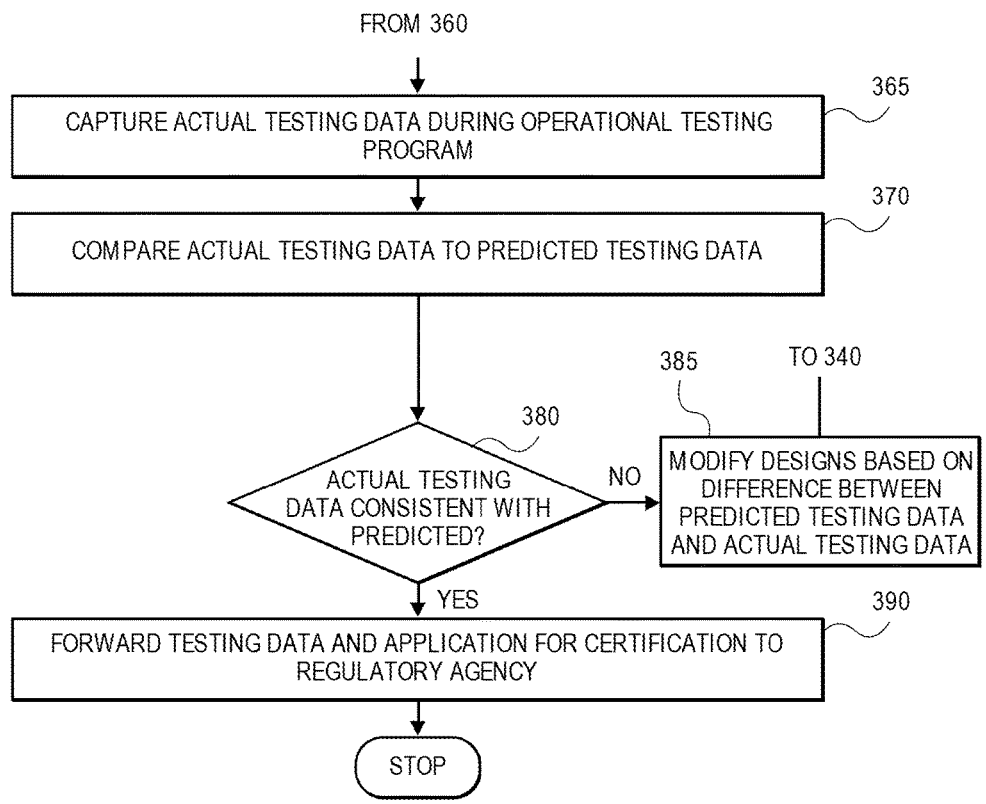

Referring to FIG. 3, a flow chart 300 of one operational testing process that may be performed using a wind tunnel for aerial vehicle certification in accordance with embodiments of the present disclosure is shown. At box 310, an outer airframe of a new aerial vehicle including a custom mount for mounting the aerial vehicle to a gimbaled sting within a wind tunnel is designed. For example, where a new UAV is desired in order to perform surveillance operations, traffic monitoring, parcel deliveries, or any other missions or functions, a design of an airframe of the UAV having one or more wings, motors, control surfaces, appurtenances or other structures may be developed. The design may include an outer mold line, or "OML," that features or contemplates a customized mount for mating with the gimbaled sting in any manner. For example, referring again to FIGS. 1F and 1G, the custom mount 156 of the aerial vehicle 150 may be designed to mate with the mounting plate 138 of the gimbaled sting 137, in a manner that aligns the round bores 153A and the elongated bores 153B with one or more corresponding holes in the custom mount 156 for receiving the fasteners 151 therein, and that also enables the communications port 125 of the mounting plate 138 to mate with the communications connector 158 of the custom mount 156. At box 320, a computational fluid dynamics (or "CFD") analysis that predicts the forces encountered by the newly designed aerial vehicle airframe during operations is developed based on sizes and shapes of the airframe and any operational requirements of the aerial vehicle.

At box 325, an interior of the aerial vehicle is designed based on the computational fluid dynamics analysis. For example, the aerial vehicle may be designed to include internal support structures featuring any number of components or features for performing one or more missions or functions, and such structures, components or features may be configured to support or accommodate one or more loads or loading conditions during operations. At box 330, one or more regulatory requirements for the aerial vehicle may be identified in pertinent regulations. For example, as is discussed above, where an aerial vehicle is to be certified for operation in the United States, Europe or Japan, the aerial vehicle must satisfy requirements promulgated by the FAA, the EASA and/or the JCAB, respectively. Such requirements typically mandate that an aerial vehicle demonstrate acceptable operating qualities at critical loads within ranges of speed or altitude for which certification is desired. Based on such requirements, a flight maneuvering envelope, or V-n diagram, may be derived as a plot of a load factor n versus an airspeed for the specific requirements.

At box 335, positions, orientations and/or deflections of the aerial vehicle for performing evolutions to demonstrate compliance with the regulatory requirements are selected. Positions or orientations of the aerial vehicle and/or deflections of its control surfaces may be selected based on anticipated airspeeds or attitudes of the aerial vehicle, or the anticipated operations of one or more control surfaces such as rudders, ailerons, elevators, flaps or other features, as may be required in order to confirm that the aerial vehicle is airworthy and complies with the relevant regulatory requirements of a jurisdiction. At box 340, the aerial vehicle is constructed in accordance with the designs of the outer airframe and the interior.

At box 345, the newly constructed aerial vehicle is mounted to the gimbaled sting via the custom mount, and at box 350, an operational testing program is prepared based on the regulatory requirements. For example, the operational testing program (or testing plan) may specify the particular orientations, configurations or positions of the aerial vehicle, and the air speeds or pressures of wind to which the aerial vehicle must be subjected, in order to satisfy the regulatory requirements identified at box 330. The operational testing program may specify times or durations for which airflow must pass over the aerial vehicle, as well as velocities or pressures of the airflow, with the aerial vehicle aligned in specific orientations or configurations. The operational testing program may also specify angles at which the control surfaces of the aerial vehicle are to be deflected, or positions where the centers of gravity must be placed, in order to simulate various loading conditions of the aerial vehicle during operation.

At box 355, testing data (or testing results) that are expected to be received during the performance of the operational testing program are predicted. At box 360, the operational testing program is conducted within the wind tunnel, in accordance with the selected positions or orientations of the aerial vehicle and/or deflections of the control surfaces.

At box 365, actual testing data is captured from the aerial vehicle during the operational testing program. Such testing data may include, but is not limited to, observed pressure differentials along wings, control surfaces or other appurtenances of the aerial vehicle, as well as flow conditions passing over or around various other surfaces of an airframe and/or fuselage of the aerial vehicle. Such testing data may be captured using sensors mounted within the wind tunnel, e.g., Pitot tubes or anemometers, as well as imaging devices, temperature sensors or hygrometers, or using sensors mounted to gimbaled sting or the aerial vehicle, e.g., one or more strain gages, accelerometers, gyroscopes, magnetometers, acoustic sensors or imaging devices.

At box 370, the testing data that was actually captured at box 365 is compared to the testing data that was predicted for the design at box 355. At box 380, if the actual testing data is inconsistent with the testing data that was predicted, then the process advances to box 385, where the designs of the aerial vehicle (e.g., the outer airframe and/or the interior) are modified based on the differences between the predicted testing data and the actual testing data, before returning to box 340, where the aerial vehicle is constructed in accordance with the designs. If the actual testing data is consistent with the predicted testing data, however, then the process advances to box 390, where the testing data and an application for certification are forwarded to the regulatory agency, and the process ends.

Figure 4:
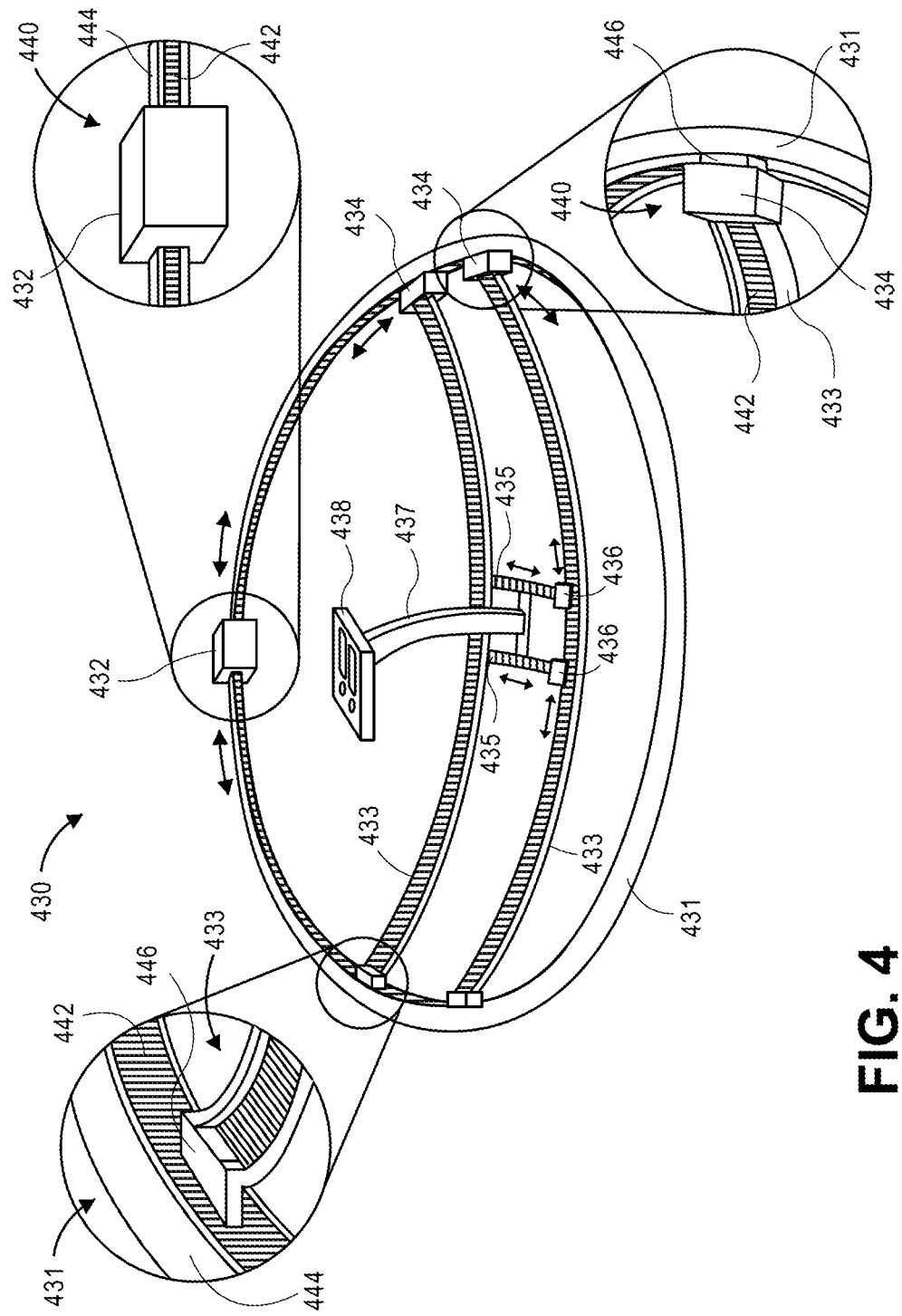
FIG. 4 is a view of aspects of one embodiment of a wind tunnel for aerial vehicle certification in accordance with embodiments of the present disclosure.

As is discussed above, the gimbaled sting of the present disclosure may be oriented, configured or positioned using one or more motorized components that may feature rails, tracks or other features. Referring to FIG. 4, a bowl assembly 430 is shown. The bowl assembly 430 includes a substantially circular yaw track 431, a pair of arcuate pitch tracks 433, a pair of arcuate roll tracks 435 and a gimbaled sting 437 having a mounting plate 438 disposed on a free end thereof. Except where otherwise noted, reference numerals preceded by the number "4" shown in FIG. 4 indicate components or features that are similar to components or features having similar reference numerals preceded by the number "2" shown in FIG. 2 or by the number "1" shown in FIGS. 1A through 1G.

As is shown in FIG. 4, the bowl assembly 430 includes a motorized cable driver 432 disposed on the yaw track 431, which includes a C-shaped support 444. The motorized cable driver 432 includes a motor 440 for driving a cable carrier 442 in clockwise or counter-clockwise directions. Each of the arcuate pitch tracks 433 has, at each of their respective ends, a cable mount 446 by which the respective pitch tracks 433 are mounted to the cable carrier 442 within the yaw track 431. Thus, operating the motorized cable driver 432 causes the pitch tracks 433 to rotate about a vertical axis of the bowl assembly 430 by driving the cable carrier 442 in clockwise or counter-clockwise directions, as desired.

As is also shown in FIG. 4, each of the pitch tracks 433 further includes a motorized cable driver 434 disposed at one end thereof. As is noted above, the motorized cable drivers 434 of the pitch tracks 433 are joined to the cable carrier 442 within the yaw track 431 by the motor mounts 446, and also include motors 440 that are configured to extend or retract cable carriers 442 within the pitch tracks 433 in linear directions, e.g., forward or backward, along lengths of the respective pitch tracks 433. Additionally, each of the roll tracks 435 is joined to the cable carriers 442 within the pitch tracks 433 in a manner similar to that by which the pitch tracks 433 may be joined to the cable carrier 442 within the yaw track 431. Thus, operating the motorized cable drivers 434 of the pitch tracks 433 causes the roll tracks to rotate about a lateral horizontal axis of the bowl assembly 430. The roll tracks 435 also includes motorized cable drivers 436 for driving cable carriers therein in linear directions, and the gimbaled sting 437 may be joined to such cable carriers within the roll tracks 435 in a manner similar to that by which the pitch tracks 433 are joined to the cable carrier 442 within the yaw track 431. Thus, operating the motorized cable carriers 436 of the roll tracks 435 causes the gimbaled sting 437 to rotate about a longitudinal axis of the bowl assembly 430.

Thus, like the bowl assembly 130 of FIGS. 1A through 1G, the bowl assembly 430 of FIG. 4 may position the gimbaled sting 437, and any test object (e.g., an aerial vehicle) mounted thereon, about any yaw, pitch or roll angle by operating the motorized cable drivers 432, 434, 436 separately or in concert to rotate the gimbaled sting 437 about one or more of the vertical axis, the longitudinal horizontal axis or the longitudinal axis, as may be desired or required in order to complete one or more testing evolutions and demonstrate that the test object complies with one or more relevant regulatory requirements.

Figure 5A:
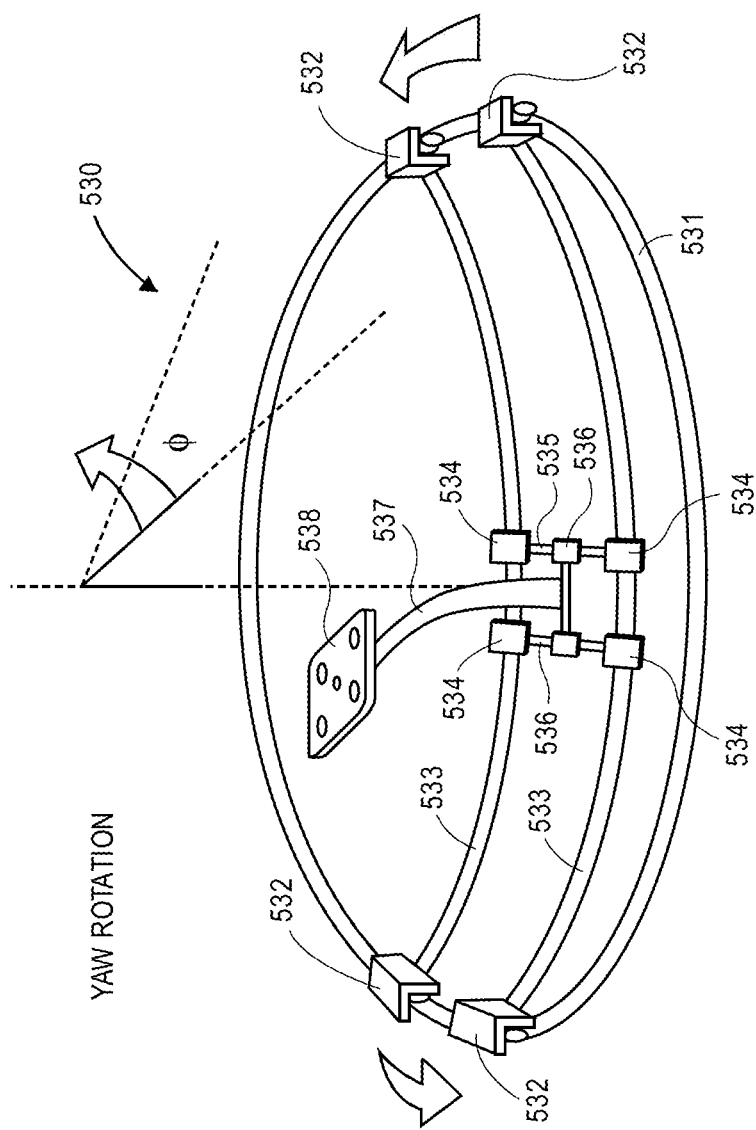
FIGS. 5A, 5B and 5C are views of portions of one embodiment of a wind tunnel for aerial vehicle certification in accordance with embodiments of the present disclosure.
Figure 5B:
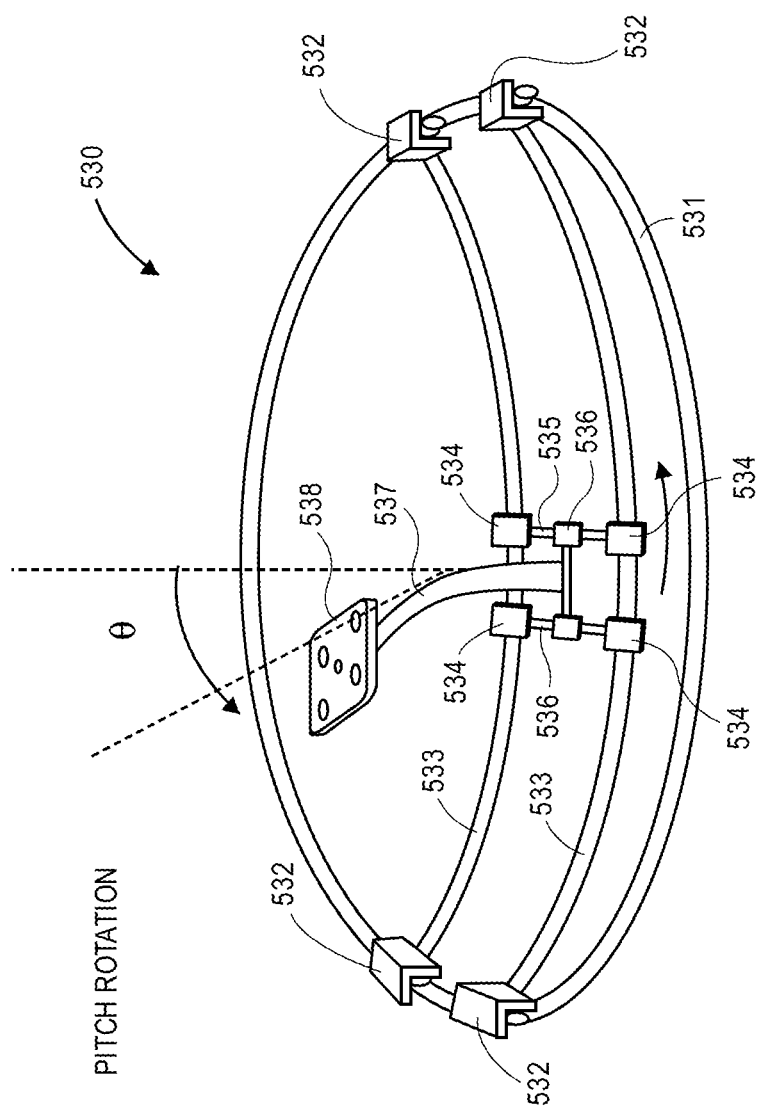
Figure 5C:
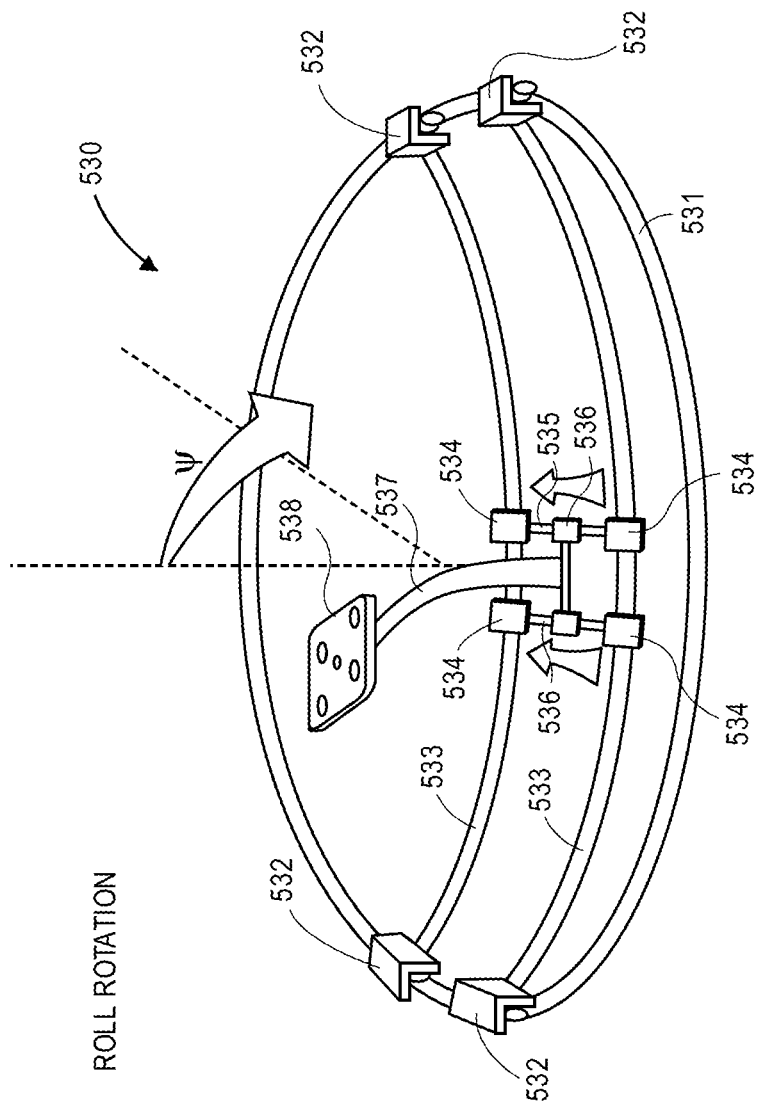

As is discussed above, the wind tunnels of the present disclosure are outfitted with bowl assemblies or like features that may automatically reorient, reconfigure and/or reposition a gimbaled sting with an aerial vehicle or other test object mounted thereon about any desired yaw, pitch and/or roll angle. Referring to FIGS. 5A, 5B and 5C, views of portions of one embodiment of a wind tunnel for aerial vehicle certification in accordance with embodiments of the present disclosure are shown. Except where otherwise noted, reference numerals preceded by the number "5" shown in FIGS. 5A, 5B and 5C indicate components or features that are similar to components or features having similar reference numerals preceded by the number "4" shown in FIG. 4, by the number "2" shown in FIG. 2 or by the number "1" shown in FIGS. 1A through 1G.

As is shown in FIGS. 5A, 5B and 5C, the bowl assembly 530 includes a circular yaw rail 531, a pair of arcuate pitch rails 533, a pair of arcuate roll rails 535 and a gimbaled sting 537 having a mounting plate 538. The pitch rails 533 are aligned in parallel with one another, and each of the pitch rails 533 includes a motorized roller assembly 532 disposed at either end. Each of the motorized roller assemblies 532 rests atop the circular yaw rail 531, and is configured to travel in a circumferential direction (e.g., clockwise or counter-clockwise) along an upper surface of the circular yaw rail 531. The roll rails 535 are aligned in parallel with one another, and each of the roll rails 535 includes a motorized roller assembly 534 disposed at either end. Each of the motorized roller assemblies 534 rests atop one of the pitch rails 533, and is configured to travel along an arcuate upper surface of the one of the pitch rails 533. The gimbaled sting 537 has a base section with a pair of motorized roller assemblies mounted thereto. Each of the motorized roller assemblies 536 rests atop one of the roll rails and is configured to travel along an arcuate upper surface of the one of the roll rails 535. Alternatively, the pitch rails 533, the roll rails 535 and/or the gimbaled sting 537 may include any other type of motorized assemblies for traveling on, below or within the yaw rail 531, the pitch rails 533 or the roll rails 535, respectively. Moreover, one or more of the yaw rail 531, the pitch rails 533 or the roll rails 535 may instead be or include tracks or other features for receiving moving equipment therein, such as one or more of the yaw track 431, the pitch tracks 433 and the roll tracks 435 of FIG. 4.

Using the bowl assembly 530, or like systems, an aerial vehicle or other test object mounted to the mounting plate 538 may be oriented, configured or positioned about a longitudinal axis, a lateral horizontal axis and/or a vertical axis, as necessary, in any desired yaw angle, pitch angle or roll angle. As is shown in FIG. 5A, the gimbaled sting 537 may be positioned at any yaw angle φ, about a vertical axis by operating the motorized roller assemblies 532 in concert, e.g. in a clockwise or a counter-clockwise direction, and as necessary to rotate the gimbaled sting 537 to the desired yaw angle φ. As is shown in FIG. 5B, the gimbaled sting 537 may be positioned at any pitch angle θ about a lateral horizontal axis by operating the motorized roller assemblies 534 in concert, e.g., in a forward or a backward direction, and as necessary to rotate the gimbaled sting 537 to the desired pitch angle θ. As is shown in FIG. 5C, the gimbaled sting 537 may be positioned at any roll angle ψ about a longitudinal axis by operating the motorized roller assemblies 536 in concert, e.g., in a left or a right direction, and as necessary to rotate the gimbaled sting 537 to the desired roll angle ψ. Those of ordinary skill in the pertinent arts will recognize that the motorized roller assemblies 532, 534, 536 may be operated separately or concurrently to reorient, reconfigure or reposition the gimbaled sting 537, and an aerial vehicle or another test object mounted to the mounting plate 538, to a desired yaw angle φ, a desired pitch angle θ and a desired roll angle ψ, respectively.

Figure 6:
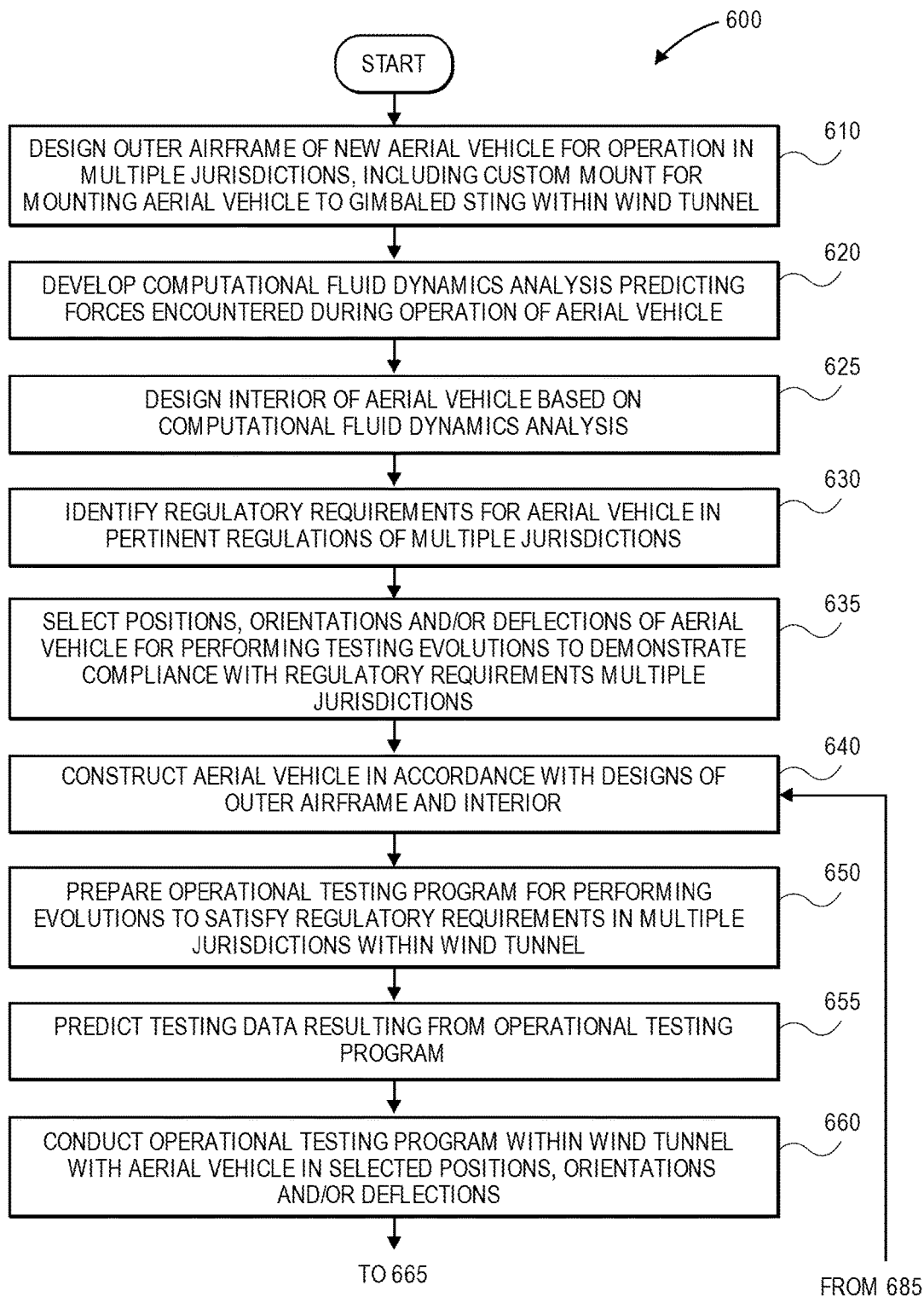
FIG. 6 is a flow chart of one operational testing process that may be performed using a wind tunnel for aerial vehicle certification in accordance with embodiments of the present disclosure.
Figure 6:
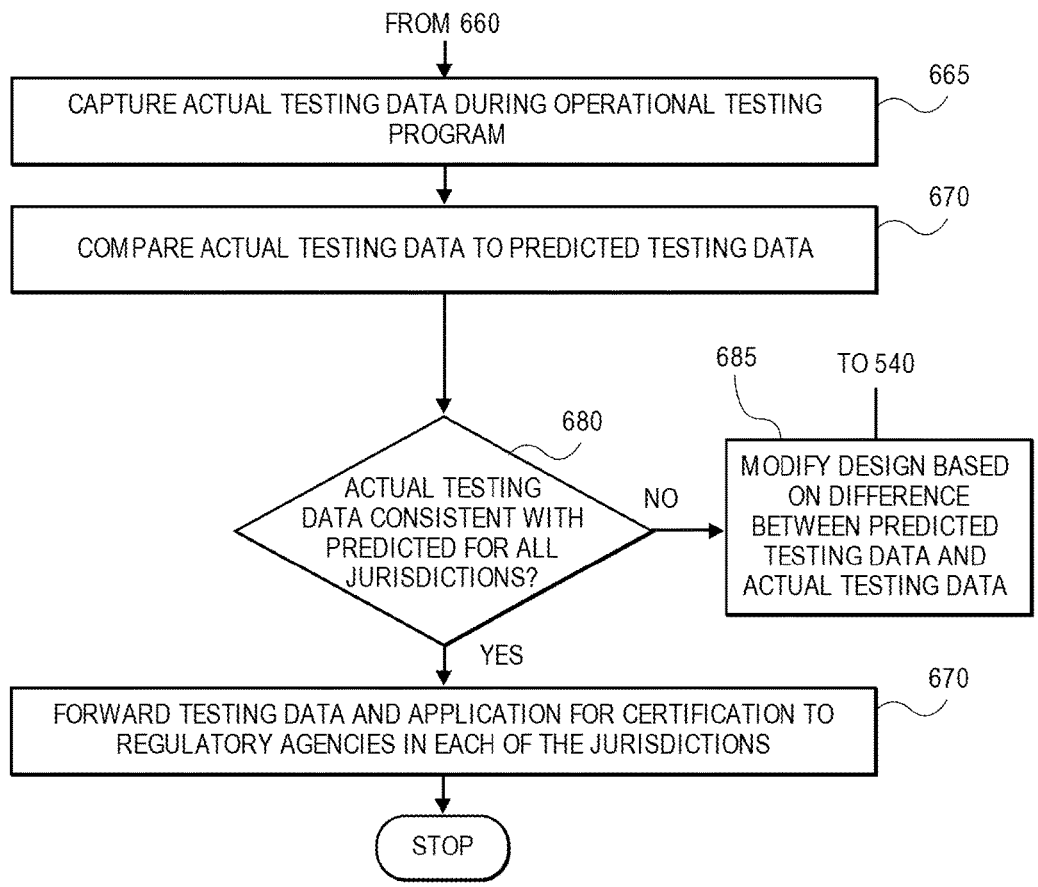

As is discussed above, the compliance of a given aerial vehicle design with the various requirements of multiple jurisdictions may be confirmed by executing multiple testing evolutions with the wind tunnels and gimbaled stings of the present disclosure, and a testing program or testing plan that efficiently confirms the requirements of such jurisdictions in a logical and/or sensible order may be established accordingly. Referring to FIG. 6, a flow chart 600 of one operational testing process that may be performed using a wind tunnel for aerial vehicle certification in accordance with embodiments of the present disclosure is shown. At box 610, At box 610, an outer airframe of a new aerial vehicle including a custom mount for mounting the aerial vehicle to a gimbaled sting within a wind tunnel is designed for operation in multiple jurisdictions. As is discussed above, the design may include an outer mold line, or "OML," that features or contemplates a customized mount for mating with the gimbaled sting in any manner. At box 620, a CFD analysis that predicts forces that will be encountered by the newly designed aerial vehicle airframe during operations is developed based on sizes and shapes of the airframe and any operational requirements of the aerial vehicle.

At box 625, an interior of the aerial vehicle is designed based on the CFD analysis. The interior may include internal support structures and any other components or features for performing one or more missions or functions, and such structures, components or features may be configured to support or accommodate one or more loads or loading conditions during operations. At box 630, one or more regulatory requirements for the aerial vehicle may be identified in the pertinent regulations of the multiple jurisdictions, e.g., the regulations of the FAA, the EASA and/or the JCAB in the United States, Europe or Japan, or of any other regulatory agencies in any other jurisdiction. At box 635, positions, orientations and/or deflections of the aerial vehicle for performing evolutions to demonstrate compliance with the regulatory requirements of the multiple jurisdictions are selected. At box 640, the aerial vehicle is constructed in accordance with the designs of the outer airframe and the interior.

At box 650, an operational testing program for performing the evolutions to demonstrate compliance with the regulatory requirements in the multiple jurisdictions is prepared. The operational testing program may specify orientations, configurations or positions of the aerial vehicle during the evolutions, as well as timing and/or durations of air flows through the wind tunnel, in a manner that optimizes the collection of data necessary in order to certify the aerial vehicle with respect to the requirements of the multiple jurisdictions. For example, the operational testing program may subjectively order the specific evolutions to minimize the time required to complete the evolutions, to minimize the extent to which a bowl assembly or other feature must be operated in order to reorient, reconfigure or reposition a gimbaled sting, or on any other basis.

At box 655, testing data resulting from the performance of the operational testing program is predicted, and at box 660, the operational testing program is conducted within the wind tunnel with the aerial vehicle in the selected positions, orientations and/or deflections. At box 665, actual testing data is captured during the performance of the operational testing program.

At box 670, the captured testing data that was actually captured is compared to the testing data that was predicted for the design at box 655. At box 680, if the actual testing data is inconsistent with the testing data that was predicted for any of the jurisdictions, then the process advances to box 685, where the design is modified based on the differences between the predicted testing data and the actual testing data, before returning to box 640, where the aerial vehicle is constructed in accordance with the design. If the actual testing data is consistent with the predicted testing data, however, then the process advances to box 690, where the relevant testing data and applications for certification are forwarded to the regulatory agencies in the various jurisdictions, and the process ends.

Figure 7:
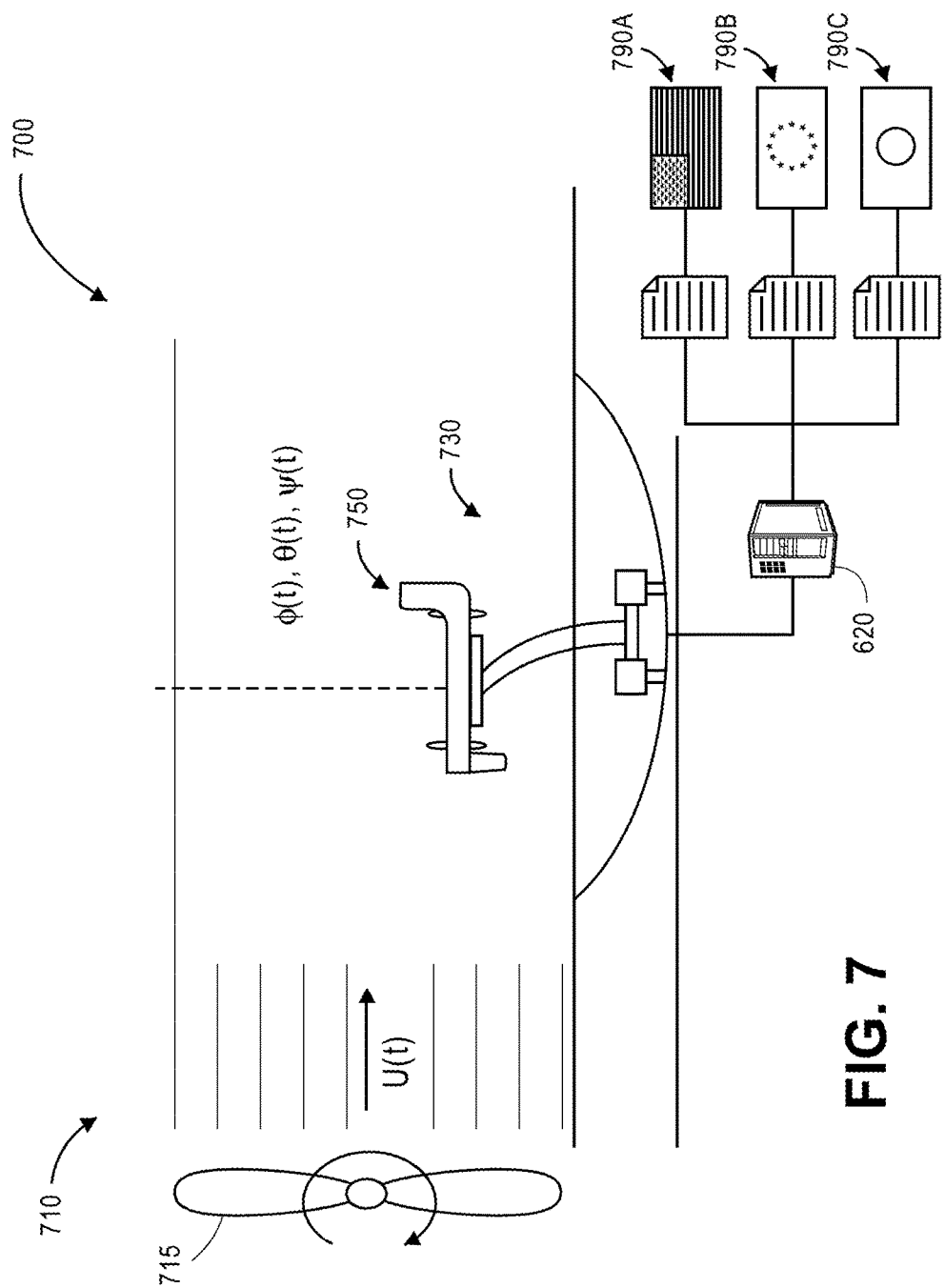
FIG. 7 is a view of one embodiment of a wind tunnel for aerial vehicle certification in accordance with embodiments of the present disclosure.

As is discussed above, the wind tunnels of the present disclosure enable testing evolutions for certifying an aerial vehicle design in multiple jurisdictions to be completed concurrently and in an efficient manner. Referring to FIG. 7, a view of one embodiment of a wind tunnel for aerial vehicle certification in accordance with embodiments of the present disclosure is shown. Except where otherwise noted, reference numerals preceded by the number "7" shown in FIG. 7 indicate components or features that are similar to components or features having similar reference numerals preceded by the number "5" shown in FIGS. 5A, 5B and 5C, by the number "4" shown in FIG. 4, by the number "2" shown in FIG. 2 or by the number "1" shown in FIGS. 1A through 1G.

As is shown in FIG. 7, a system 700 having a wind tunnel 710 that includes an ingress fan 715, a control system 720 and a bowl assembly 730 is shown. The ingress fan 715 is configured to generate a wind flow through the wind tunnel 710 at a velocity U(t). The bowl assembly 730 is configured to orient, configure or position an aerial vehicle 750 mounted thereto at a desired yaw angle ϕ(t), a desired pitch angle θ(t) or at a desired roll angle ψ(t), as required in order to perform one or more testing evolutions. The control system 720 may control the operation of the ingress fan 715 as necessary to achieve the desired velocity U(t), and also control the operation of the bowl assembly 730 to achieve the desired yaw angle ϕ(t), the desired pitch angle θ(t) or the desired roll angle ψ(t). The control system 720 may also capture information or data regarding the completion of one or more testing evolutions within the wind tunnel 710 using one or more sensors (not shown). Such sensors may be mounted to one or more walls, ceilings, floors or other surfaces of the wind tunnel 710, or to surfaces of the aerial vehicle 750, as necessary. After the information or data has been captured, the control system 720 may transmit relevant information or data to each of a plurality of jurisdictions 790A, 790B, 790C, as required or desired.

Figure 8A:
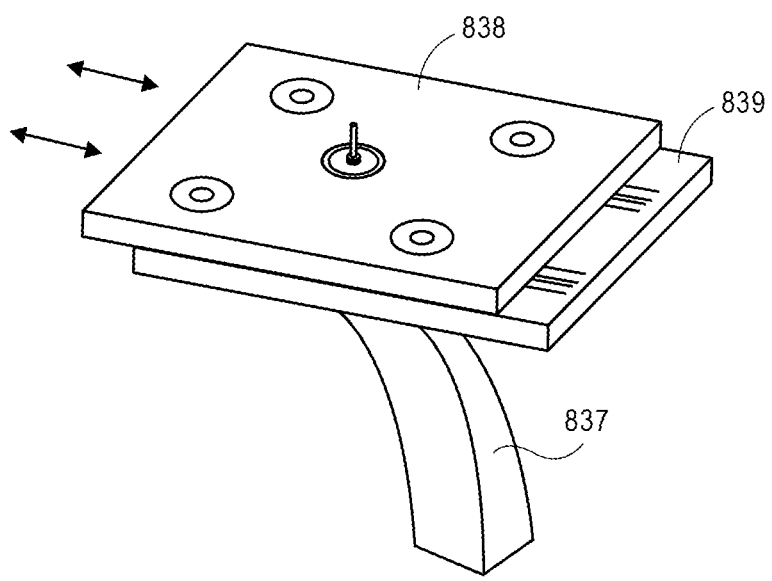
FIGS. 8A and 8B are views of aspects of one embodiment of a system including a wind tunnel for aerial vehicle certification in accordance with embodiments of the present disclosure.
Figure 8B:
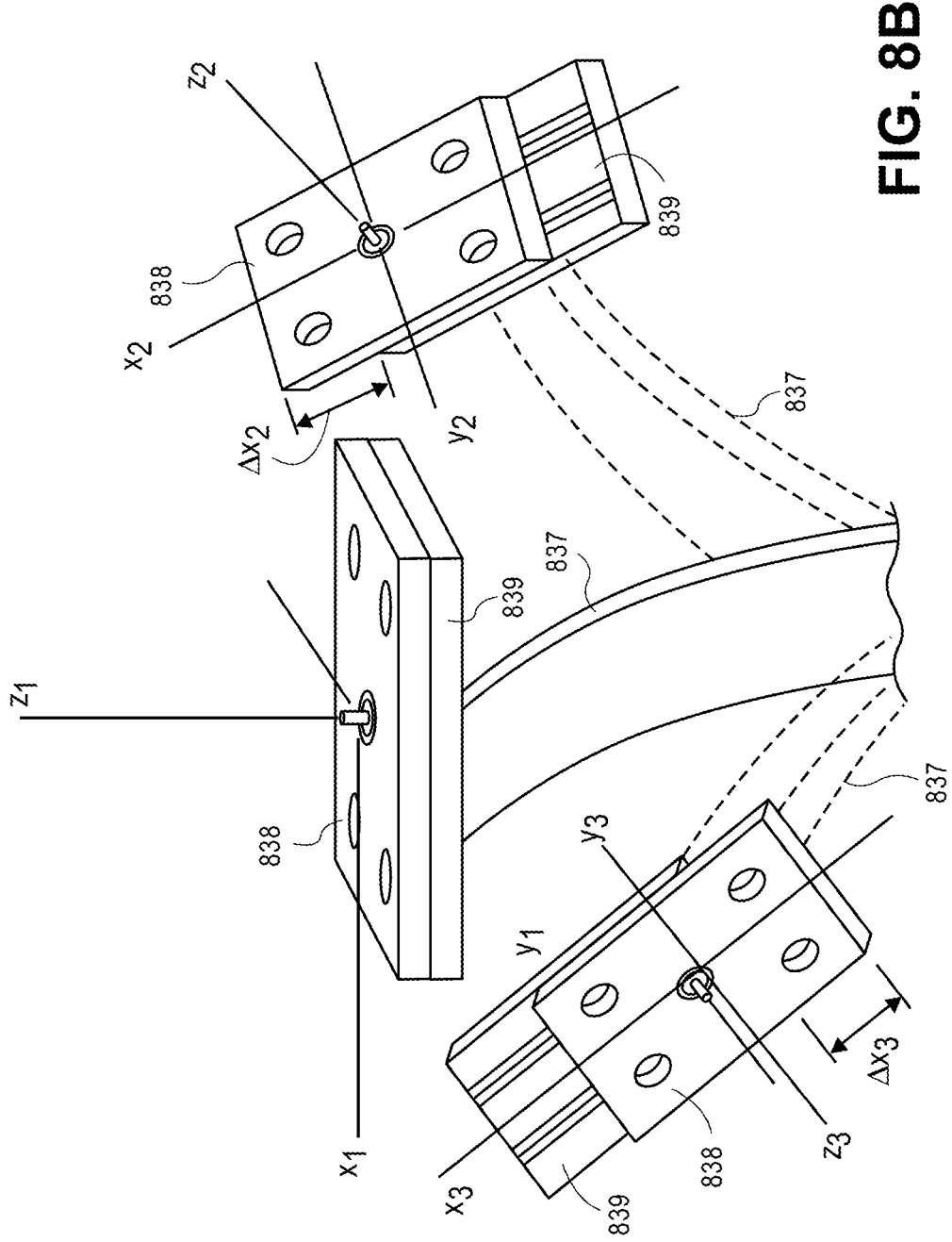

In addition to orienting, configuring or positioning an aerial vehicle or other test object about principal axes, e.g., at desired yaw angles, pitch angles or roll angles, the wind tunnels of the present disclosure may also include components for translating the aerial vehicle in one or more directions, such as directions corresponding to the principal axes. Referring to FIGS. 8A and 8B, a view of one embodiment of a wind tunnel for aerial vehicle certification in accordance with embodiments of the present disclosure is shown. Except where otherwise noted, reference numerals preceded by the number "8" shown in FIG. 8A or FIG. 8B indicate components or features that are similar to components or features having similar reference numerals preceded by the number "7" shown in FIG. 7, by the number "5" shown in FIGS. 5A, 5B and 5C, by the number "4" shown in FIG. 4, by the number "2" shown in FIG. 2 or by the number "1" shown in FIGS. 1A through 1G.

As is shown in FIG. 8A, a free end of a gimbaled sting 837 includes a motorized mount 838 and a tracked support 839. The motorized mount 838 is configured to move forward or backward, as necessary, along a longitudinal axis of the gimbaled sting 837. Thus, where an aerial vehicle or another test object mounted to the motorized mount 838 (not shown) must be placed in a simulated loading condition and/or an eccentric or non-standard center of gravity in order to complete one or more testing requirements, the aerial vehicle or other test object may be translated forward or backward to place the aerial vehicle in a position corresponding to the simulated loading condition or the eccentric or non-standard center of gravity. Additionally, or alternatively, the motorized mount 838 and the tracked support 839 may be configured to translate the motorized mount 838 and any aerial vehicles or other test objects mounted thereto in any direction, including but not limited to directions corresponding to the lateral horizontal axis or the vertical axis of the gimbaled sting 837.

The motorized mount 838 may be operated in concert with one or more motorized assemblies (not shown) to orient, configure or position aerial vehicles or other test objects disposed thereon at desired yaw angles, pitch angles and/or roll angles. For example, as is shown in FIG. 8B, in a first orientation, the motorized mount 838 may be aligned with the tracked support 839, and with the gimbaled sting 837 oriented with a neutral longitudinal axis $x_1$, a neutral lateral horizontal axis $y_1$ and a neutral vertical axis $z_1$, i.e., with a yaw angle, a pitch angle and a roll angle of zero. In a second orientation, the motorized mount 838 may be extended forward beyond an alignment of the tracked support 839 by a distance $\Delta x_2$ in the direction of the longitudinal axis $x_2$, even as the gimbaled sting 837 is reoriented to a non-zero yaw angle, a non-zero pitch angle and a non-zero roll angle. Based on the extension of the motorized mount 838 forward by the distance $\Delta x_2$, the center of gravity of an aerial vehicle or another test object mounted thereon (not shown) is similarly extended forward by the distance $\Delta x_2$. In a third orientation, the motorized mount 838 may be retracted backward with respect to the alignment of the tracked support 839 by a distance $\Delta x_3$ in the direction of the longitudinal axis $x_3$, even as the gimbaled sting 837 is reoriented to another non-zero yaw angle, another non-zero pitch angle or another non-zero roll angle. Based on the retraction of the motorized mount 838 backward by the distance $\Delta x_3$, the center of gravity of an aerial vehicle or another test object mounted thereon (not shown) is similarly retracted by the distance $\Delta x_3$.

The bowl assemblies of the present disclosure may further feature one or more covers that may be mounted over various components of the bowl assemblies, e.g., various rails, motorized assemblies or other features, while allowing a gimbaled sting or other support for an aerial vehicle or another test object to extend therethrough. Such covers may be formed form one or more integral pieces, and may enhance the flow performance within a wind tunnel, e.g., by minimizing turbulence associated with airflows over the bowl assembly, and also enable one or more sensors, computer systems or like components to be stored beneath the bowl assembly and utilized during operation of the wind tunnel.

Referring to FIGS. 9A through 9E, views of aspects of one embodiment of a system 900 including a wind tunnel for aerial vehicle certification in accordance with embodiments of the present disclosure are shown. Except where otherwise noted, reference numerals preceded by the number "8" shown in FIGS. 9A through 9E indicate components or features that are similar to components or features having similar reference numerals preceded by the number "8" shown in FIG. 8A or FIG. 8B, by the number "7" shown in FIG. 7, by the number "4" shown in FIGS. 5A, 5B and 5C, by the number "4" shown in FIG. 4, by the number "2" shown in FIG. 2 or by the number "1" shown in FIGS. 1A through 1G.

As is shown in FIGS. 9A through 9E, the wind tunnel 910 includes a bowl assembly 930 having a circular yaw rail 931, a pair of arcuate pitch rails 933, a pair of arcuate roll rails 935 and a gimbaled sting 937 having a mounting plate 938. The pitch rails 933 are aligned in parallel with one another, and each of the pitch rails 933 includes a motorized roller assembly 932 disposed at either end and resting atop the circular yaw rail 931. The roll rails 935 are aligned in parallel with one another, and each of the roll rails 935 includes a motorized roller assembly 934 disposed at either end and resting atop the pitch rails 933. The gimbaled sting 937 has a base section with a pair of motorized roller assemblies 936 mounted thereto and resting atop the roll rails 935.

The wind tunnel 930 further includes a disc-shaped cover 916 having an orifice 918 therein. The cover 916 includes a plurality of sections (or subparts) 916A, 916B, 916C, each of which overlaps and/or intersects to define the orifice 918. The sections 916A, 916B, 916C interact with one another in a manner similar to that of the leaves of a leaf shutter, and have shapes that define the circular perimetric shape of the cover 916 and also defining the internal shape of the orifice 918, which may shift within the circular perimetric shape by the movement of the various sections 916A, 916B, 916C. Although the cover 916 is shown as having three sections 916A, 916B, 916C, a cover may be defined from any number of sections in accordance with the present disclosure.

As is shown in FIGS. 9A through 9E, the gimbaled sting 937 extends through the orifice 918 of the cover 916, which remains in place over the yaw rail 931, the pitch rails 933 and the roll rails 935, and the various motorized assemblies 932, 934, 936. Thus, the cover 916 may reduce turbulence or other adverse effects of flow passing over the various components of the bowl assembly 930 while permitting the gimbaled sting 937 to be repositioned, as necessary, to reorient an aerial vehicle or any other test object disposed thereon in accordance with one or more testing requirements. The cover 916 also permits one or more sensors or computer devices (not shown), e.g., servers or other systems for operating a control system, to be disposed thereunder and utilized by the wind tunnel 910 during the performance of testing evolutions therein.

Figure 9A:
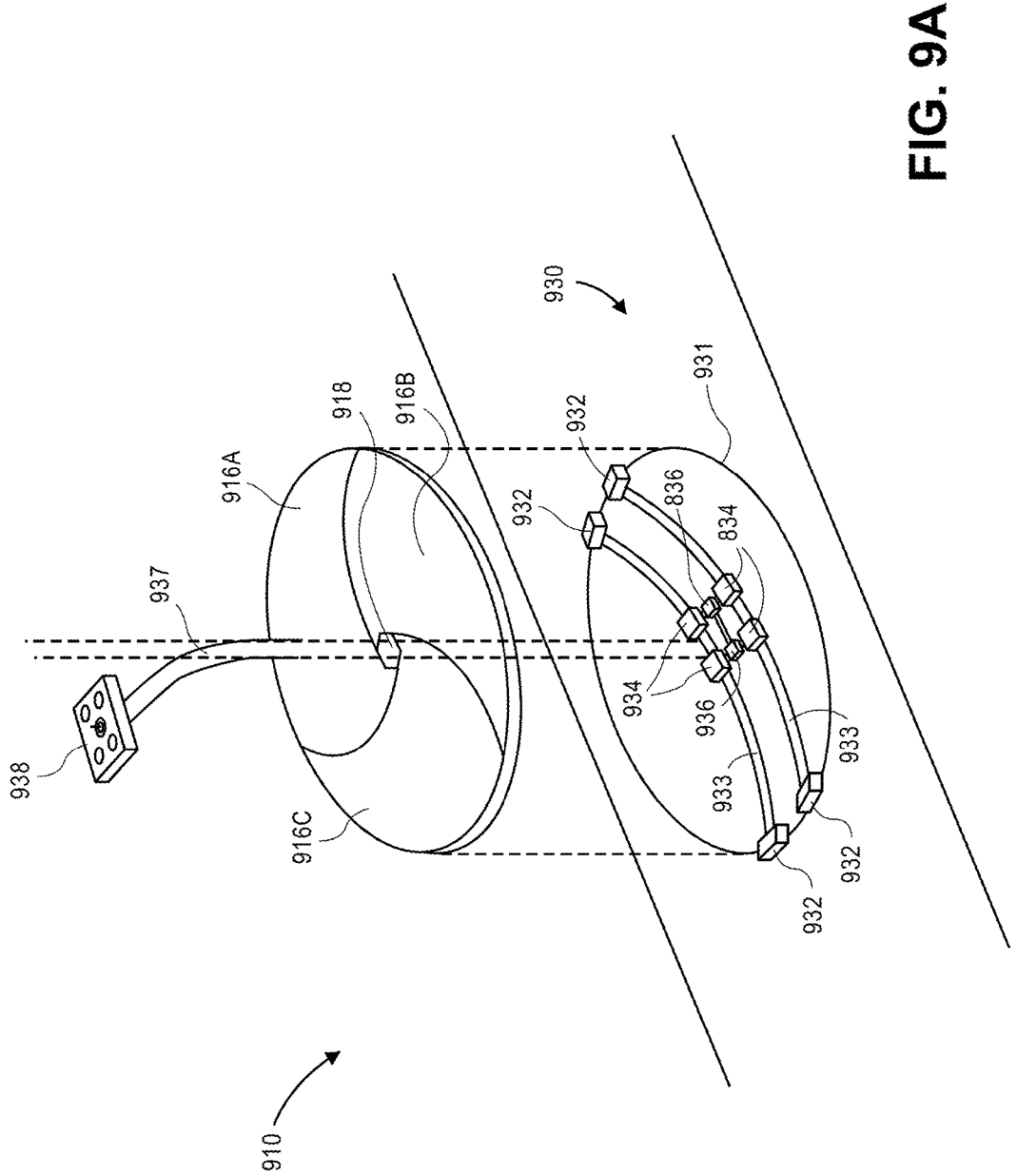
Figure 9B:
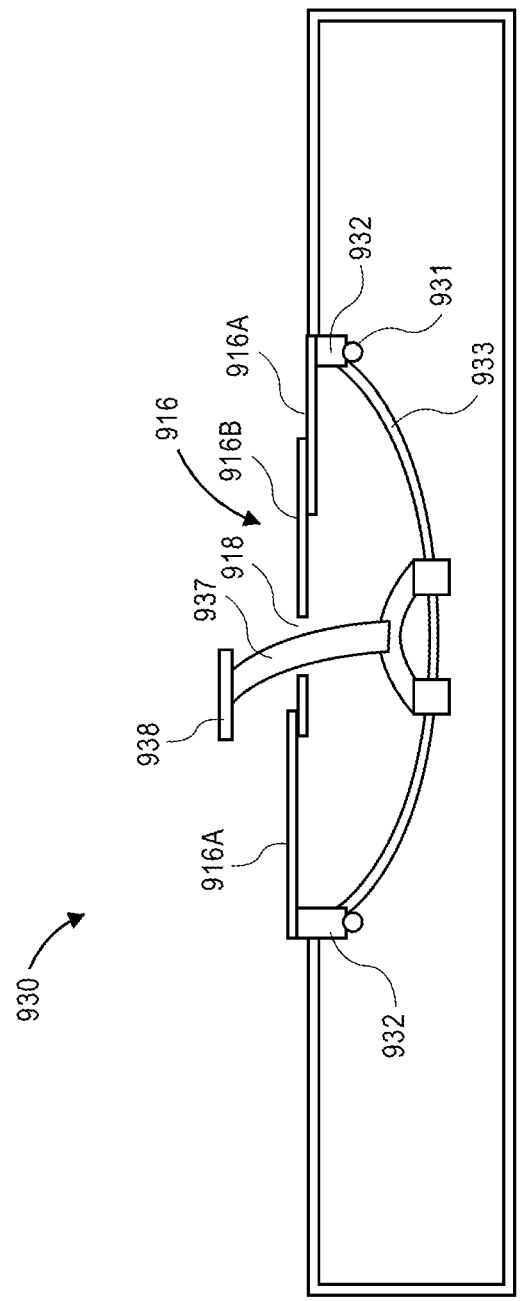
Figure 9C:
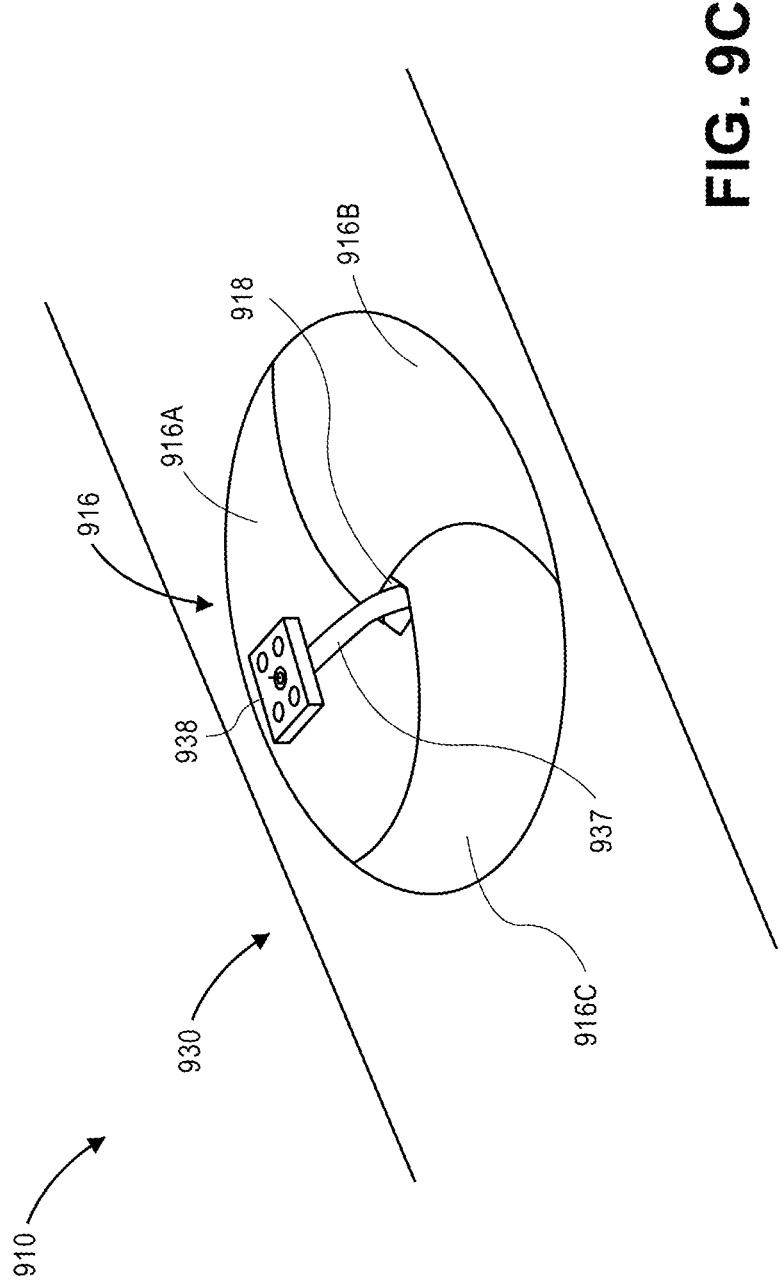

As is discussed above, the sections 916A, 916B, 916C enable the cover 916 to respond to movement of the gimbaled sting 937 while remaining in place above the yaw rail 931, the pitch rails 933 and the roll rails 935, and below the mounting plate 938. For example, as is shown in FIG. 9C, with the gimbaled sting 937 aligned in a neutral orientation, each of the sections 916A, 916B, 916C is also aligned in a neutral orientation that defines a central location of the orifice 918, e.g., coaxial with a vertical axis of the gimbaled sting 937. When the gimbaled sting 937 is reoriented, reconfigured or repositioned, however, the sections 916A, 916B, 916C may reposition themselves in order to maintain the cover 916 in position, and in a round disc shape, while the orifice 918 is translated accordingly. As is shown in FIG. 9D, when the gimbaled sting 937 is rolled clockwise, pitched backward and rolled right, the sections 916A, 916B, 916C may shift, slide or rotate to cause the orifice 918 to translate accordingly and remain in position around the gimbaled sting 937. Similarly, and as is shown in FIG. 9E, when the gimbaled sting is rolled counter-clockwise, pitched forward and rolled left, the sections 916A, 916B, 916C may shift, slide or rotate to cause the orifice 918 to translate accordingly and remain in position around the gimbaled sting 937.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments disclosed herein show the use of wind tunnels and gimbaled stings for the initial testing of an aerial vehicle design, the systems and methods of the present disclosure are not so limited. One or more embodiments of the wind tunnels and gimbaled stings may be used to perform any regular, periodic or unplanned inspections, such as those outlined or described in Title 14, Part 43 of the Code of Federal Regulations. Moreover, any test object may be mounted to a gimbaled sting, and evaluated a wind tunnel, in accordance with the present disclosure. The embodiments of the systems and methods disclosed herein are not limited to the evaluation of aerial vehicles, either manned or unmanned.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 3 and 6, the order in which the steps of the methods or processes are listed is not intended to be construed as a limitation on the claimed inventions, and any number of the method or process steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Although the invention has been described and illustrated with respect to exemplary embodiments thereof, the foregoing and various other additions and omissions may be made therein and thereto without departing from the spirit and scope of the present disclosure.

What is claimed is:

1. A testing system comprising:
   a wind tunnel having a cavity defined by an upper surface, a lower surface, a left side surface and a right side surface;
   a pressure sensor provided within the wind tunnel;
   a bowl assembly mounted in the lower surface, wherein the bowl assembly comprises:
      a yaw rail having a circular shape;
      a first pitch rail having a first end, a second end, a first motorized roller disposed at the first end and a second motorized roller disposed at the second end, wherein at least a portion of the first pitch rail has an arcuate shape and extends between a first upper portion of the yaw rail and a second upper portion of the yaw rail, wherein the first motorized roller is in rolling contact with the first upper portion of the yaw rail, and wherein the second motorized roller is in rolling contact with the second upper portion of the yaw rail;
      a second pitch rail having a third end, a fourth end, a third motorized roller disposed at the third end and a fourth motorized roller disposed at the fourth end, wherein at least a portion of the second pitch rail has an arcuate shape and extends in parallel with the first pitch rail between a third upper portion of the yaw rail and a fourth upper portion of the yaw rail, wherein the third motorized roller is in rolling contact with the third upper portion of the yaw rail, and wherein the fourth motorized roller is in rolling contact with the fourth upper portion of the yaw rail;
      a first roll rail having a fifth end, a sixth end, a fifth motorized roller disposed at the fifth end and a sixth motorized roller disposed at the sixth end, wherein at least a portion of the first roll rail has an arcuate shape and extends between a first concave portion of the first pitch rail and a first concave portion of the second pitch rail, wherein the fifth motorized roller is in rolling contact with the first concave portion of the first pitch rail, and wherein the sixth motorized roller is in rolling contact with the first concave portion of the second pitch rail; and
      a second roll rail having a seventh end, an eighth end, a seventh motorized roller disposed at the seventh end and an eighth motorized roller disposed at the eighth end, wherein at least a portion of the second roll rail has an arcuate shape and extends between a second concave portion of the first pitch rail and a second concave portion of the second pitch rail, wherein the seventh motorized roller is in rolling contact with the second concave portion of the first pitch rail, and wherein the eighth motorized roller is in rolling contact with the second concave portion of the second pitch rail; and
      a gimbaled sting having a free end, a base section, a ninth motorized roller mounted to the base section and a tenth motorized roller mounted to the base section, wherein the ninth motorized roller is in rolling contact with a concave portion of the first roll rail, and wherein the tenth motorized roller is in rolling contact with a concave portion of the second roll rail;
   an aerial vehicle releasably mounted to the free end of the gimbaled sting; and
   at least one computer device in communication with each of the pressure sensor, the first motorized roller, the second motorized roller, the third motorized roller, the fourth motorized roller, the fifth motorized roller, the sixth motorized roller, the seventh motorized roller, the eighth motorized roller, the ninth motorized roller and the tenth motorized roller.

2. The testing system of claim 1, wherein the at least one computer device is configured to at least:
   identify a testing evolution associated with a regulatory requirement of the aerial vehicle;
   determine an orientation of the aerial vehicle associated with the testing evolution;
   determine a yaw angle, a pitch angle and a roll angle associated with the orientation;
   operate the first motorized roller, the second motorized roller, the third motorized roller and the fourth motorized roller to place the aerial vehicle at the yaw angle associated with the orientation;
   operate the fifth motorized roller, the sixth motorized roller, the seventh motorized roller and the eight motorized roller to place the aerial vehicle at the pitch angle associated with the orientation;
   operate the ninth motorized roller and the tenth motorized roller to place the aerial vehicle at the roll angle associated with the orientation;
   determine an airflow associated with the testing evolution; and
   initiate the airflow within the wind tunnel.

3. The testing system of claim 2, wherein the at least one computer device is in communication with the aerial vehicle, and
   wherein the at least one computer device is configured to at least:
   identify an operation of a control surface of the aerial vehicle associated with the regulatory requirement;
   determine a deflection of the control surface associated with the operation; and
   cause the aerial vehicle to place the control surface at the deflection.

4. A method comprising:
   mounting an aerial vehicle to a gimbaled sting within a wind tunnel, wherein the gimbaled sting is configured to orient the aerial vehicle about at least one of a longitudinal axis of the aerial vehicle, a lateral horizontal axis of the aerial vehicle or a vertical axis of the aerial vehicle;
   identifying a first desired orientation of the aerial vehicle associated with a first predetermined testing evolution for the aerial vehicle;
   determining at least one of a yaw angle, a pitch angle or a roll angle of the aerial vehicle associated with the first desired orientation;

orienting the aerial vehicle about the at least one of the longitudinal axis, the lateral horizontal axis or the vertical axis to place the aerial vehicle at the at least one of the yaw angle, the pitch angle or the roll angle associated with the first desired orientation;

identifying at least one of a desired air velocity or a desired air pressure associated with the first predetermined testing evolution;

initiating air flow within the wind tunnel consistent with at least one of the desired air velocity or the desired air pressure; and capturing first information regarding at least one of the air flow or the aerial vehicle by at least one sensor mounted to at least one of an internal surface of the wind tunnel, an external surface of the aerial vehicle, or an external surface of the gimbaled sting.

5. The method of claim 4, further comprising:

identifying a deflection of a control surface of the aerial vehicle associated with the first predetermined testing evolution; and initiating the deflection of the control surface of the aerial vehicle within the air flow.

6. The method of claim 5, wherein the control surface is one of a portion of a wing, a rudder, an aileron, an elevator, a flap, a brake or a slat.

7. The method of claim 4, wherein the wind tunnel comprises a bowl assembly comprising:

the gimbaled sting, wherein the gimbaled sting comprises a base section and a free end;

a circular yaw component;

a first pitch component having a first end in rolling contact with a first portion of the yaw component and a second end in rolling contact with a second portion of the yaw component;

a second pitch component in parallel with the first pitch component, wherein the second pitch component comprises a first end in rolling contact with a third portion of the yaw component and a second end in rolling contact with a fourth portion of the yaw component;

a first roll component having a first end in rolling contact with a first portion of the first pitch component and a second end in rolling contact with a first portion of the second pitch component; and a second roll component in parallel with the first pitch component, wherein the second pitch component comprises a first end in rolling contact with a second portion of the first pitch component and a second end in rolling contact with a second portion of the second pitch component, wherein the base section of the gimbaled sting comprises a first end in rolling contact with a portion of the first roll component and a second end in rolling contact with a portion of the second roll component.

8. The method of claim 7, wherein the free end comprises a mounting plate having at least a first bore thereon;

wherein the aerial vehicle comprises a mounting section having at least a second bore thereon corresponding to the first mounting plate, and wherein the aerial vehicle is mounted to the gimbaled sting by the mounting plate and the mounting section.

9. The method of claim 8, wherein the mounting plate comprises a motorized unit configured to translate the mounting plate in at least one direction with respect to the gimbaled sting, and wherein the method further comprises:

determining at least one of a simulated loading condition or a simulated center of gravity of the aerial vehicle associated with the first predetermined testing evolution;

determining a distance associated with the at least one of the simulated loading condition or the simulated center of gravity; and causing the mounting plate to translate in the at least one direction with respect to the gimbaled sting by the distance.

10. The method of claim 8, wherein the mounting section comprises a first communications connection, wherein the mounting plate further comprises a second communications connection configured to mate with the first communication connection, and wherein mounting the aerial vehicle to the gimbaled sting within the wind tunnel further comprises:

causing the first communication connection to mate with the second communication connection.

11. The method of claim 7, wherein determining the at least one of the yaw angle, the pitch angle or the roll angle of the aerial vehicle associated with the first desired orientation comprises:

determining a circumferential distance along the yaw component associated with the yaw angle; and determining a circumferential direction associated with the circumferential distance, wherein the circumferential direction is one of clockwise or counter-clockwise, and wherein orienting the aerial vehicle about the at least one of the longitudinal axis, the lateral horizontal axis or the vertical axis to place the aerial vehicle at the at least one of the yaw angle, the pitch angle or the roll angle comprises:

causing the first end of the first pitch component to move in the circumferential direction by the circumferential distance on the yaw component;

causing the second end of the first pitch component to move in the circumferential direction by the circumferential distance on the yaw component;

causing the first end of the second pitch component to move in the circumferential direction by the circumferential distance on the yaw component; and causing the second end of the second pitch component to move in the circumferential direction by the circumferential distance on the yaw component.

12. The method of claim 7, wherein determining the at least one of the yaw angle, the pitch angle or the roll angle of the aerial vehicle associated with the first desired orientation comprises:

determining an arcuate distance along the first pitch component or the second pitch component associated with the pitch angle; and determining a direction associated with the arcuate distance, wherein the direction is one of forward or backward, and wherein orienting the aerial vehicle about the at least one of the longitudinal axis, the lateral horizontal axis or the vertical axis to place the aerial vehicle at the at least one of the yaw angle, the pitch angle or the roll angle comprises:

causing the first end of the first roll component to move in the direction by the arcuate distance on the first pitch component;

causing the first end of the second roll component to move in the direction by the arcuate distance on the first pitch component;

causing the second end of the first roll component to move in the direction by the arcuate distance on the second pitch component; and causing the second end of the second roll component to move in the direction by the arcuate distance on the second pitch component.

13. The method of claim 7, wherein determining the at least one of the yaw angle, the pitch angle or the roll angle of the aerial vehicle associated with the first desired orientation comprises:

determining an arcuate distance along the first roll component or the second roll component associated with the roll angle; and determining a direction associated with the arcuate distance, wherein the direction is one of left or right, and wherein orienting the aerial vehicle about the at least one of the longitudinal axis, the lateral horizontal axis or the vertical axis to place the aerial vehicle at the at least one of the yaw angle, the pitch angle or the roll angle comprises:

causing the first end of the base section to move in the direction by the arcuate distance on the first roll component; and causing the second end of the base section to move in the direction by the arcuate distance on the second roll component.

14. The method of claim 7, wherein the at least one sensor comprises at least one of:

a Pitot tube mounted to the internal surface of the wind tunnel;

an anemometer mounted to the internal surface of the wind tunnel;

a pressure sensor mounted to the internal surface of the wind tunnel;

an imaging device mounted to the internal surface of the wind tunnel;

a pressure sensor mounted to the external surface of the aerial vehicle;

an acoustic sensor mounted to the internal surface of the wind tunnel;

a strain gage mounted to the external surface of the aerial vehicle;

a vibration sensor mounted to the external surface of the aerial vehicle;

an accelerometer associated with the aerial vehicle;

a gyroscope associated with the aerial vehicle;

a vibration sensor mounted to the gimbaled sting;

a tension sensor mounted to the gimbaled sting; or a compression sensor mounted to the gimbaled sting; and wherein the first information comprises at least one of:

an air pressure within the wind tunnel;

an air velocity within the wind tunnel;

a pressure differential over the external surface of the aerial vehicle;

an angle of orientation of the aerial vehicle; or imaging data regarding at least one portion of the aerial vehicle.

15. The method of claim 7, wherein the bowl assembly further comprises a cover disposed above the yaw component, wherein the cover comprises a plurality of sections defining a circular perimeter and a translatable orifice, wherein the gimbaled sting extends through the translatable orifice, wherein the aerial vehicle is mounted to the gimbaled sting on a first side of the cover, and wherein each of the yaw component, the first pitch component, the second pitch component, the first roll component, the second roll component and the base section of the gimbaled sting is disposed on the second side of the cover.

16. The method of claim 4, further comprising:

generating a design of at least one of an airframe of the aerial vehicle, a propulsion motor of the aerial vehicle or a control surface of the aerial vehicle based at least in part on a first regulatory requirement;

constructing the at least one of the airframe, the propulsion motor or the control surface in accordance with the design;

generating a flight maneuvering envelope for the aerial vehicle based at least in part on the design; and selecting the first predetermined testing evolution based on the flight maneuvering envelope.

17. The method of claim 16, further comprising:

predicting a result of the first predetermined testing evolution based at least in part on the design and the flight maneuvering envelope;

determining an actual result of the first predetermined testing evolution based at least in part on the first information regarding the at least one of the air flow or the aerial vehicle captured by the at least one sensor;

determining a comparison of the actual result to the predicted result; and determining that the aerial vehicle complies with the first regulatory requirement based at least in part on the comparison.

18. The method of claim 16, wherein the design of the at least one of the airframe, the propulsion motor or the control surface is generated based at least in part on the first regulatory requirement and a second regulatory requirement, and wherein the method further comprises:

selecting the second regulatory requirement based at least in part on the flight maneuvering envelope;

identifying a second desired orientation of the aerial vehicle associated with a second predetermined testing evolution for the aerial vehicle;

determining at least one of a yaw angle, a pitch angle or a roll angle of the aerial vehicle associated with the second desired orientation;

orienting the aerial vehicle about the at least one of the longitudinal axis, the lateral horizontal axis or the vertical axis to place the aerial vehicle at the at least one of the yaw angle, the pitch angle or the roll angle associated with the second desired orientation;

identifying at least one of a desired air velocity or a desired air pressure associated with the second predetermined testing evolution;

initiating air flow within the wind tunnel consistent with at least one of the desired air velocity or the desired air pressure; and capturing second information regarding at least one of the air flow or the aerial vehicle by at least one sensor.

19. The method of claim 18, wherein the first regulatory requirement is associated with the Federal Aviation Administration of the United States, and wherein the second regulatory requirement is associated with a regulatory body of a country other than the United States.

20. A bowl assembly comprising:

a first rail having a circular shape;

a second rail having a first end, a second end, a first motorized roller disposed at the first end and a second motorized roller disposed at the second end, wherein at least a portion of the second rail has an arcuate shape and extends between a first portion of the first rail and a second portion of the first rail, wherein the first motorized roller is in rolling contact with the first portion of the first rail, and wherein the second motorized roller is in rolling contact with the second portion of the first rail;

a third rail having a third end, a fourth end, a third motorized roller disposed at the third end and a fourth motorized roller disposed at the fourth end, wherein at least a portion of the third rail has an arcuate shape and extends in parallel with the second rail between a third portion of the first rail and a fourth portion of the first rail, wherein the third motorized roller is in rolling contact with the third portion of the first rail, and wherein the fourth motorized roller is in rolling contact with the fourth portion of the first rail;

a fourth rail having a fifth end, a sixth end, a fifth motorized roller disposed at the fifth end and a sixth motorized roller disposed at the sixth end, wherein at least a portion of the fourth rail has an arcuate shape and extends between a first portion of the second rail and a first portion of the third rail, wherein the fifth motorized roller is in rolling contact with the first portion of the second rail, and wherein the sixth motorized roller is in rolling contact with the first portion of the third rail;

a fifth rail having a seventh end, an eighth end, a seventh motorized roller disposed at the seventh end and an eighth motorized roller disposed at the eighth end, wherein at least a portion of the fifth rail has an arcuate shape and extends between a second portion of the second rail and a second portion of the third rail, wherein the seventh motorized roller is in rolling contact with the second portion of the second rail, and wherein the eighth motorized roller is in rolling contact with the second portion of the third rail; and a gimbaled sting having a free end, a base section, a ninth motorized roller mounted to the base section and a tenth motorized roller mounted to the base section, wherein the ninth motorized roller is in rolling contact with a portion of the fourth rail, and wherein the eighth motorized roller is in rolling contact with a portion of the fifth rail.

* * * * *